(12) United States Patent
Kondo

(10) Patent No.: US 6,690,491 B1
(45) Date of Patent: Feb. 10, 2004

(54) IMAGE PROCESSING APPARATUS FOR OVERLAPPING BIT MAP DATA AND VECTOR DATA

(75) Inventor: Tsuyoshi Kondo, Fukuoka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/506,488

(22) Filed: Feb. 18, 2000

(30) Foreign Application Priority Data

Feb. 23, 1999 (JP) .......................................... 11-044373

(51) Int. Cl.$^7$ .......................... G06K 15/00; H03N 1/40
(52) U.S. Cl. ........................................ 358/3.01; 358/521
(58) Field of Search .......................... 358/1.1, 1.2, 1.9, 358/3.01, 3.21, 3.23, 521, 530, 540, 447, 461; 382/169, 178, 197, 274, 275, 302, 305, 298, 299; 345/544, 589, 603, 634

(56) References Cited

U.S. PATENT DOCUMENTS

| | | | | |
|---|---|---|---|---|
| 5,388,192 A | * | 2/1995 | Ohsawa et al. | 345/634 |
| 5,404,448 A | * | 4/1995 | Bowen et al. | 345/544 |
| 5,506,941 A | * | 4/1996 | Kurumida | 358/1.11 |
| 5,521,722 A | * | 5/1996 | Colvill et al. | 358/500 |
| 5,544,284 A | * | 8/1996 | Allebach et al. | 345/603 |
| 5,832,141 A | * | 11/1998 | Ishida et al. | 382/298 |
| 5,978,522 A | * | 11/1999 | Ishii et al. | 382/299 |
| 6,052,126 A | * | 4/2000 | Sakuraba et al. | 345/582 |
| 6,104,374 A | * | 8/2000 | Sullivan et al. | 345/694 |
| 6,118,463 A | * | 9/2000 | Houki et al. | 347/116 |
| 6,260,044 B1 | * | 7/2001 | Nagral et al. | 707/102 |
| 6,342,896 B1 | * | 1/2002 | Shetter et al. | 345/589 |

* cited by examiner

*Primary Examiner*—Gabriel Garcia
(74) *Attorney, Agent, or Firm*—Stevens, Davis, Miller & Mosher, LLP

(57) ABSTRACT

In case the bit map portion data stored in a bit map portion data storage unit is overlapped with the vector portion data stored in a vector portion data storage unit, the image processing apparatus operates in the following manner. When the vector portion data has a bit map palette value indicative of a bit map, an overwrite process operation is not performed over the bit map portion data. On the other hand, when the vector portion data has a value except for the bit map palette value indicative of the bit map, the palette value of the vector portion data is bit-mapped using a palette dictionary over the bit map portion data to perform the overwrite process operation.

6 Claims, 14 Drawing Sheets

FIG.3
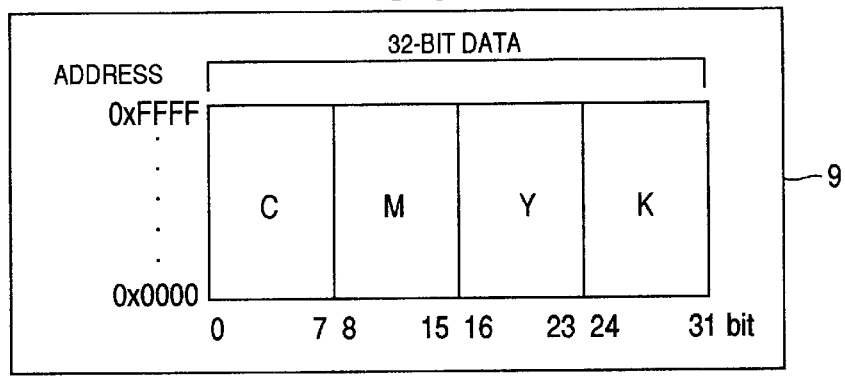
FIG.4
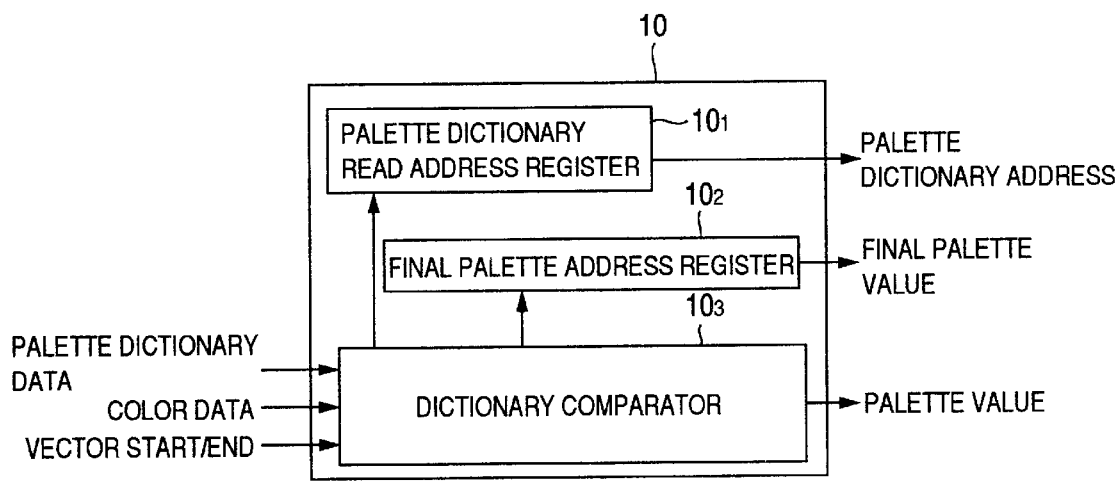
FIG.5
VECTOR DATA
| DISPLAY COLOR | BACKGROUND COLOR | SHAPE | PAINT-OVER PATTERN | OVERLAPPING ATTRIBUTE |
|---|---|---|---|---|
BIT MAP DATA
| ORIGIN | WIDTH | HEIGHT | OVERLAPPING ATTRIBUTE | PAINT-OVER PATTERN | PIXEL DATA |
|---|---|---|---|---|---|
FIG.6
PALETTE-CONVERTED VECTOR DATA
| DISPLAY COLOR PALETTE | BACKGROUND COLOR PALETTE | SHAPE | PAINT-OVER PATTERN | OVERLAPPING ATTRIBUTE |
|---|---|---|---|---|

FIG.7
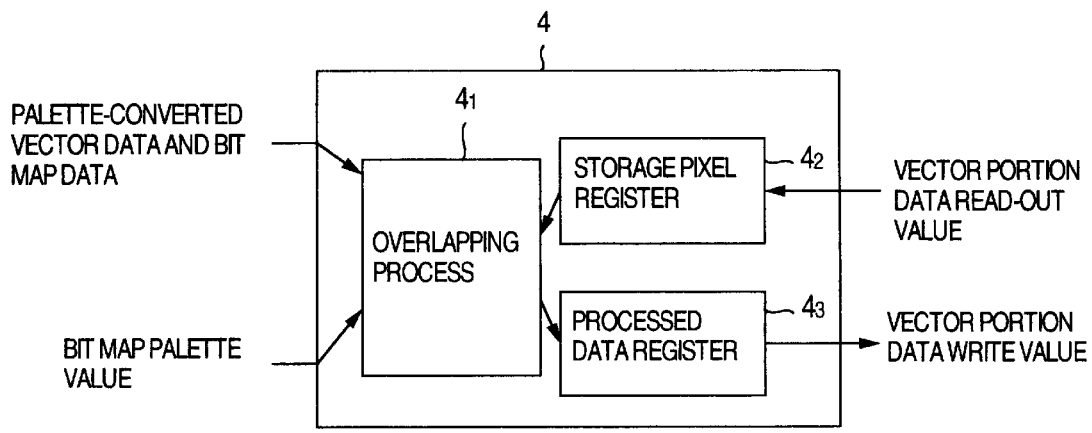
FIG.8
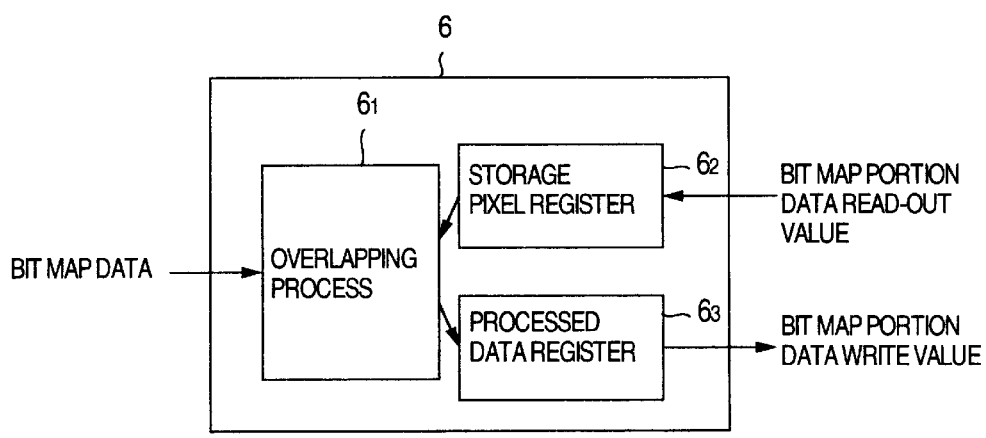
FIG.9
| OVERLAPPING ATTRIBUTE VALUE | OVERLAPPING PROCESS CONTENT |
|---|---|
| 0 | VW=VD |
| 1 | VW=S?F:B |
| 2 | VW=S?F:VD |
| 3 | VW=(S&PV)?F:B |
| 4 | VW=S?(PV?F:B):VD |
| . | . |
| . | . |
SYMBOL "X?Y" INDICATES THAT IF X IS TRUE,
THEN Z IS Y, AND IF X IS FALSE, THEN Z IS Z.

| OVERLAPPING ATTRIBUTE VALUE | OVERLAPPING PROCESS CONTENT |
|---|---|
| 0 | V W = V D |
| 1 | V W = B P |
| 2 | V W = P B ? P B : V D |
| . | . |
| . | . |

SYMBOL "X?Y" INDICATES THAT IF X IS TRUE, THEN Z IS Y, AND IF X IS FALSE, THEN Z IS Z.

| OVERLAPPING ATTRIBUTE VALUE | OVERLAPPING PROCESS CONTENT |
|---|---|
| 0 | B W = B D |
| 1 | B W = B I |
| 2 | B W = P B ? B I : B D |
| . | . |
| . | . |

SYMBOL "X?Y" INDICATES THAT IF X IS TRUE, THEN Z IS Y, AND IF X IS FALSE, THEN Z IS Z.

FIG.23
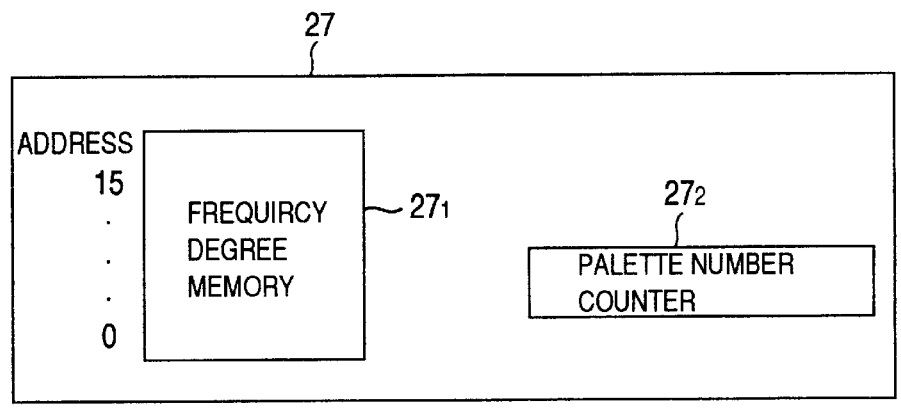
FIG.24
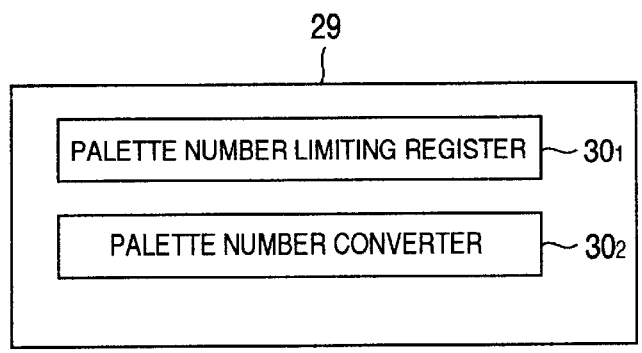
FIG.25
| 0x001 | 0x001 | 0x001 | 0x001 |
|---|---|---|---|
| 0x001 | 0x002 | 0x003 | 0x001 |
| 0x001 | 0x002 | 0x002 | 0x001 |
| 0x001 | 0x002 | 0x002 | 0x002 |
FIG.26
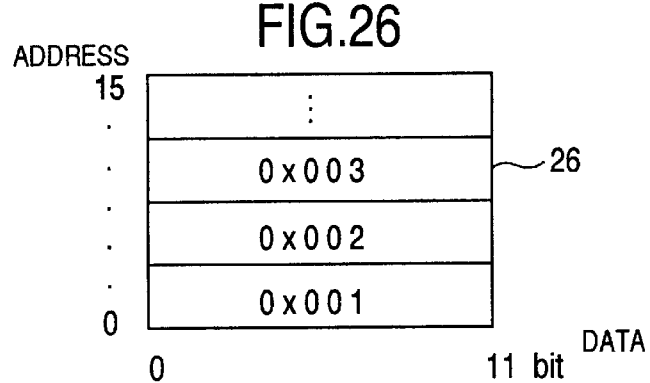

FIG.27

| 0x001 | 0x001 | 0x001 |
|---|---|---|
| 0x002 | 0x003 | 0x001 |
| 0x002 | 0x002 | 0x001 |

FIG.28

| 0x001 | 0x001 | 0x001 |
|---|---|---|
| 0x002 | 0x001 | 0x001 |
| 0x002 | 0x002 | 0x001 |

FIG.29

| 0x001 | 0x001 | 0x001 | 0x001 |
|---|---|---|---|
| 0x001 | 0x002 | 0x001 | 0x001 |
| 0x001 | 0x002 | 0x002 | 0x001 |
| 0x001 | 0x002 | 0x002 | 0x002 |

FIG.30

| 1`b0 | 1`b0 | 1`b0 | 1`b0 |
|---|---|---|---|
| 1`b0 | 1`b1 | 1`b0 | 1`b0 |
| 1`b0 | 1`b1 | 1`b1 | 1`b0 |
| 1`b0 | 1`b1 | 1`b1 | 1`b1 |

FIG.31

| CODE QUANTITY | PALETTE 0 | PALETTE 1 | · · · | PIXEL CODE DATA |
|---|---|---|---|---|

IMAGE PROCESSING APPARATUS FOR OVERLAPPING BIT MAP DATA AND VECTOR DATA

BACKGROUND OF THE INVENTION

1. Field of the Invention

The present invention is related to an image processing apparatus in which vector data and bit map data, both of which are represented in multi-gradation, are inputted.

2. Description of the Related Art

Very recently, an image containing the vector data and the bit map data is represented in color modes and multi-gradation, so that the image data amount is considerably increased. On the other hand, the very high-speed image processing requirements are made with respect to the image processing apparatus for this image. More specifically, as to an image output machine such as a printer, there are two limitations. That is, such image data is required to be stored in a memory having a limited small storage capacity, and the stored image data is required to be printed in a high speed.

Conventionally, the vector data and the bit map data are stored in the memory having the limited small storage capacity, so that these data are stored in the memory using the description language to perform the image drawing operation of the description language data when the image data is outputted. Thereby, the image output process operation may be carried out using the small memory capacity.

Referring now to FIGS. 39–41, a description will be made of a conventional image processing apparatus for executing the memory storage by the description language.

FIG. 39 is a block diagram of the conventional image processing apparatus 40 for executing the memory storage by the description language. First, vector data and bit map data are inputted into a description language converting unit 41 to be converted into the description language which the conventional image processing apparatus 40 has. FIG. 40 is a block diagram of the conventional description language converting unit 41 by the description language. In the description language converting unit 41, the bit map data is converted into a bit map format having the description language by a bit-map-portion bit map converting means 45, whereas the vector data is converted into a vector format having the description language by a vector data converting unit 44. FIG. 41 is a block diagram of the vector data converting unit 44 of the conventional image processing apparatus by the description language. The vector data inputted into the vector data converting unit 44 is converted by a data analyzing unit 46 into the combination of the description language of vectors owned by the conventional image processing apparatus 40. The image processing apparatus 40 has three description language formats (straight line, rectangular shape and bit map). The straight line, the rectangular shape and the bit map are generated by a straight line converting unit 47, a rectangular shape converting unit 48 and a vector-portion bit map converting unit 49, respectively. For example, the vector data of a circular shape is converted into the combination of the straight lines by the straight line converting unit 47 being selected in the data analyzing unit 46. The vector data of a character is converted into a bit map by the vector-portion bit map converting unit 49 is selected in the data analyzing unit 46. The vector data of a widened straight line is converted into a rectangular shape vector by the rectangular shape converting unit 48 being selected in the data analyzing means 46. These converted data are outputted as description language data. The description language data produced in the above described manner are stored in a memory by the description language storage unit 42 shown in FIG. 39. When the image data is required to be outputted, a description language expanding unit 43 performs the analysis of the description language, the bit map conversions of all of the description language data, and the overlapping process operation based on the vector data attached to the description language and also the overlapping information owned by the bit map data input. As a result, the description language expanding unit 43 outputs the image data as the bit map data.

However, in case the data amount of the description language data stored in the memory by the description language storage unit 42 is increased and the number of the data overlapping operations is increased, lengthy time would be required for a time period during which the image data output is commenced and then is accomplished. As a result, there is a problem that when the high speed output engine is employed in a real time operable electronic appliance such as a laser printer, the image data can not be expanded just in time.

SUMMARY OF THE INVENTION

The present invention is to realize such an image processing apparatus capable of storing both vector data and bit map data in a storage device having a small data storage capacity without deteriorating the inherent characteristics of the vector data and bit map data, and also capable of outputting an image in a high speed by executing an overlapping process operation only one time when image data is expanded.

BRIEF DESCRIPTION OF THE DRAWINGS

A more better understanding of the present invention is made of a detailed description to be read in conjunction with the accompanying drawings:

FIG. 3 is a structural diagram of a palette dictionary in the first embodiment;

FIG. 4 is a block diagram of a dictionary comparing unit in the first to fourth embodiments;

FIG. 5 shows a vector data structural diagram and a bit map data structural diagram in the first to fourth embodiments;

FIG. 6 is a structural diagram of palette-converted vector data in the first embodiment;

FIG. 7 is a block diagram of a vector portion data producing unit in the first to fourth embodiments;

FIG. 8 is a block diagram of a bit map portion data producing unit in the first to fourth embodiments;

FIG. 9 is a diagram representing a content of an overlapping process operation in case vector portion data is produced when vector data is inputted to the image processing apparatuses according to the first to fourth embodiments;

FIG. 23 is a block diagram of a palette sort calculating unit in the third embodiment;

FIG. 24 is a block diagram of a palette number limiting unit in the third embodiment;

FIG. 25 is a diagram indicating a block data example in the third embodiment;

FIG. 26 is a diagram indicating an example of the block dictionary in the third embodiment;

FIG. 27 is a diagram showing an example before the converting process by the palette number converter in the third embodiment mode;

FIG. 28 is a diagram showing an example after the converting process by the palette number converter in the third embodiment mode;

FIG. 29 is a diagram showing an example after the converting process of the block data by the palette number converter in the third embodiment;

FIG. 30 is a diagram showing a pixel code example of a block coding device in the third embodiment;

FIG. 31 is a structural diagram of a coded data output in case a value of a palette counter is equal to any value other than "1" in the third embodiment;

DETAILED DESCRIPTION OF THE PREFERRED EMBODIMENTS (First Embodiment)

Referring now to FIGS. 1–12, a description will be made of an image processing apparatus according to the first embodiment of the present invention.

Figure 1:
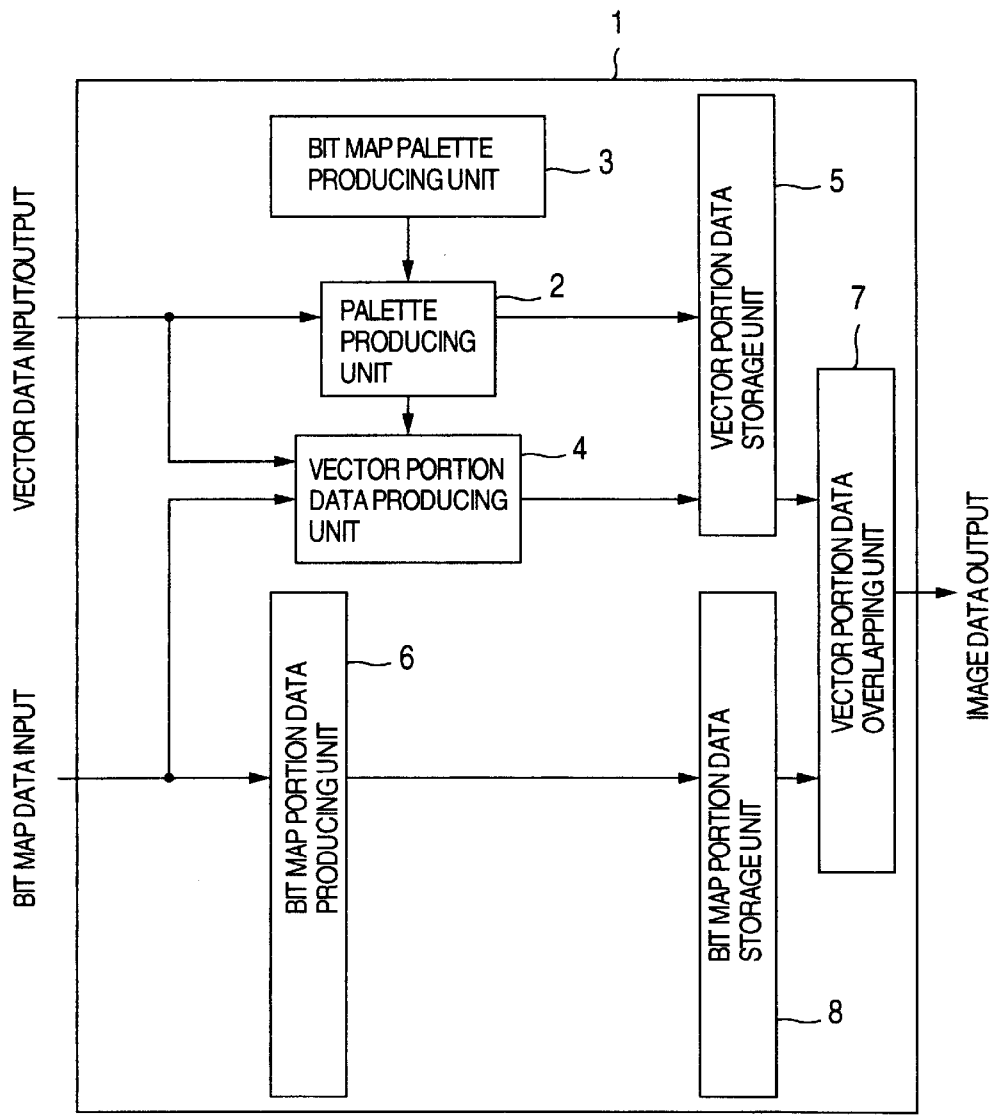
FIG. 1 is a block diagram of an image processing apparatus according to a first embodiment of the present invention.

FIG. 1 is a block diagram of the image processing apparatus according to the first embodiment. In FIG. 1, reference numeral 1 denotes the entire arrangement of the image processing apparatus.

Figure 2:
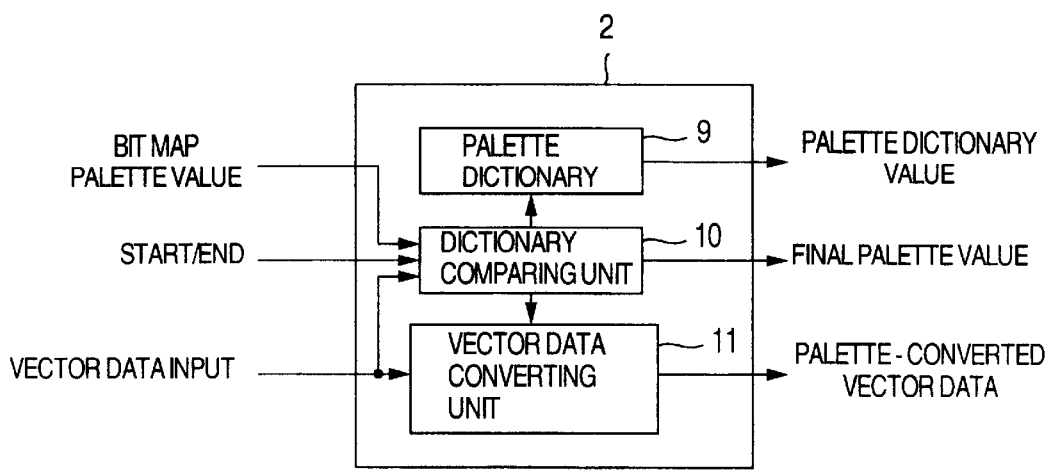
FIG. 2 is a block diagram of a palette producing unit in the first embodiment.

The image processing apparatus 1 inputs vector data and bit map data of a CMYK color space, and produces image data output. As indicated in FIG. 5, the vector data has as a content of a vector, color data constructed of a display color and a background color; a shape; a paint-over pattern; and an overlapping attribute. Also, the bit map data has as a content of a bit map, an origin; a width (W); a height (H); an overlapping attribute; a paint-over pattern; and pixel data made of WXH pixels having 4 values of C, M, Y and K as pixel values. As to the vector data, all of the vector data are first sent to a palette producing unit 2 one time. As shown in FIG. 2, the palette producing unit 2 inputs the vector data, a bit map palette value produced by a bit map palette producing unit 3 shown in FIG. 1, and a start/end signal from the inputted vector data. The structure of a palette dictionary 9 is indicated in FIG. 3. The number of the palettes which can be registered is selected to 65,536 defined from 0x0000 to 0xFFFF. The content of the palette dictionary is 32-bits data constituted by 8-bits data of C/M/Y/K. An address value of the palette dictionary is used as a pallet value. A dictionary comparing unit 10 shown in FIG. 2 comprises a palette dictionary read address register $10_1$, a final palette address register $10_2$ and a dictionary comparator $10_3$ as shown in FIG. 4. The dictionary comparing unit 10 inputs the palette dictionary data, the color data and the start/end signal. As to the color data, two color data of the vector data are inputted one by one in such a manner that the display color data is first inputted and the background color data is subsequently inputted. Also, the dictionary comparing unit 10 outputs a palette dictionary address, a final palette value, and a palette value obtained from the color data inputted. The dictionary comparator $10_3$ firstly receives the start signal to execute an initialization operation. In the initialization operation, the value of the final palette address register $10_2$ and the value of the dictionary read address register $10_1$ are set to "0". Next, upon receipt of the vector data input, in order to check as to whether or not the same color data as the color data is present in the palette dictionary 9 using the color data input, the dictionary comparing unit 10 sets the value of the palette dictionary read address register $10_1$ from "0" to a value smaller than the value of the final palette address register $10_2$ as the palette dictionary address, and then compares the C/M/Y/K values of the color data with the C/M/Y/K values of the palette dictionary data. When the same color data as the color data is present in the palette dictionary 9, the dictionary comparing unit 10 outputs the address of the palette dictionary 9 as the palette value, and then accomplishes the dictionary comparing operation to wait for the input of next color data. To the contrary, when the same color data as the color data is not present in the palette dictionary 9, the dictionary comparing unit 10 applies the final palette value as the address of the palette dictionary 9 to writes the color data as a data value of the address, and then increments the value of the final palette address register $10_2$ by "1". Using the color data for which the process operation of the dictionary comparing unit 10 has been accomplished as to the display color and the background color, a vector data converting unit 11 shown in FIG. 2 converts the display color and background color contained in the vector data input into the palette values obtained by the dictionary comparing unit 10. Then, the palette values is written back into the vector data input/output as palette-converted vector data. As indicated in FIG. 6, the palette-converted vector data has color data of a display color palette and a background color palette; a shape; a paint-over pattern; and an overlapping attribute. The palette producing unit 2 which receives the end signal applies the final palette value to the palette dictionary 9 as the address of the dictionary, executes the writing operation of the bit map palette value which is produced in the bit map palette producing unit 3, as the data value of the address, and stores both the final palette value indicative of the dictionary size and the content of the palette dictionary 9 into a vector portion data storage unit 5 shown in FIG. 1 from the address "0" to the address indicated by the final palette value. Then, the palette producing unit 2 accomplishes the palette producing operation. The bit map palette producing unit 3 shown in FIG. 1 produces the following value as a bit map palette value which is the input of the palette producing means 2. That is, the value is obtained by incrementing by "1" the final palette value which corresponds to the value of the final palette address register $10_2$ outputted from the palette producing unit 2.

Figures 10, 11, 12:
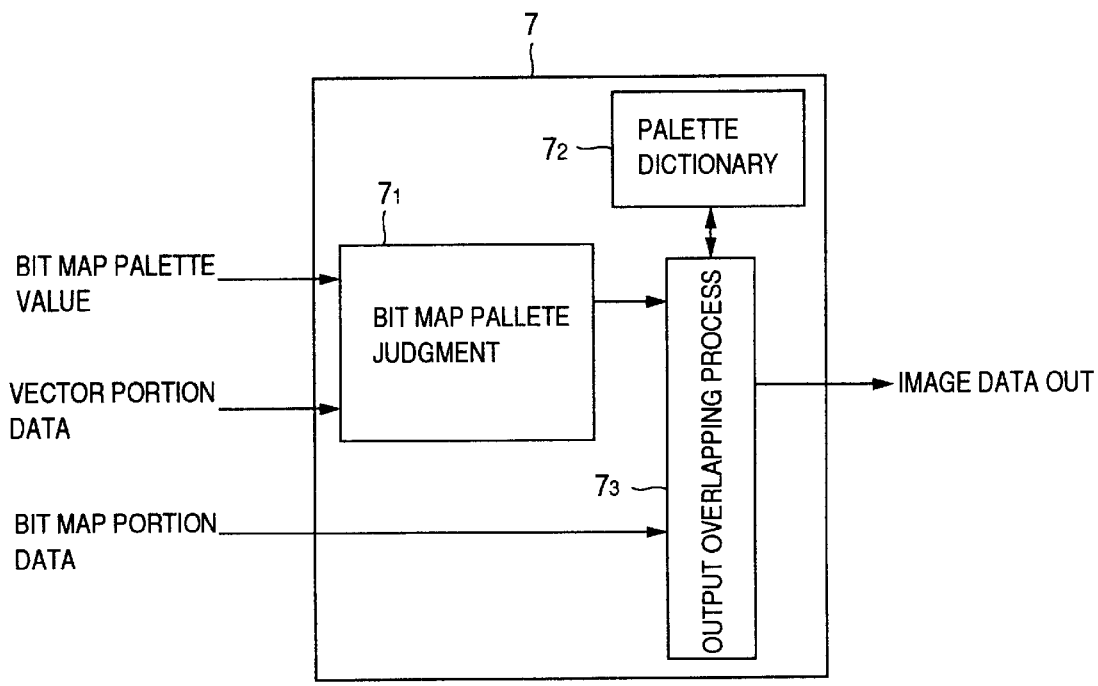
FIG. 10 is a diagram representing a content of an overlapping process operation in case vector portion data is produced when bit map data is inputted to the image processing apparatuses according to the first to fourth embodiments.
FIG. 11 is a diagram representing a content of an overlapping process operation in case bit map portion data is produced in the first to fourth embodiments.
FIG. 12 is a structural diagram of a vector portion data overlapping unit in the first embodiment.

Next, when the production of the palette dictionary 9 is ended, a vector portion data producing unit 4 shown in FIG. 1 receives the palette-converted vector data rewritten by the palette producing unit 2 and the bit map data as the vector data input and the bit map data input, respectively. Then, the vector portion data producing unit 4 produces the vector portion data based on the palette value. As indicated in FIG. 7, the vector portion data production is performed in the vector portion data producing unit 4 using the following two data. That is, the palette-converted vector data received from the vector data input/output and having the color data of the display color palette and the background color palette, the shape, the paint-over pattern, and the overlapping attribute shown in FIG. 6; and the bit map palette value obtained from the bit map palette producing unit 3 instead of the origin, the width, the height, the overlapping attribute and the pixel data of the bit map data input shown in FIG. 5. The vector portion data producing unit 4 inputs the palette-converted vector data, the bit map data and the bit map palette value, and processes the palette-converted vector data and the bit map data in the input order. When the palette-converted vector data is inputted, an overlapping process operation $4_1$ is carried out using the overlapping attribute for the following three data. That is, a value (S) at a pixel position obtained by binary-expanding the shape, a display color palette (F), and a background color palette (B); a vector portion data read-out value obtained by reading out to a storage pixel register (VD) $4_2$ the data stored in the vector data storage unit 5 shown in FIG. 1 at the pixel position; and the paint-over pattern data (PV). The overlapping processed data is written into a processed data register (VW) $4_3$, and the value of the processed data register $4_3$ is written at the pixel data position in the vector portion data storage means 5. The overlapping process operation $4_1$ is performed as shown in FIG. 9 based on the value of the overlapping attribute. When the bit map data is inputted, with respect to the pixel in the area defined by the origin, the height and the width, the overlapping process operation $4_1$ is carried out using the overlapping attribute for the following three data. That is, the bit map palette value (BP) produced by the bit map palette producing unit 3; the vector portion data read-out value obtained by reading out to the storage pixel register (VD) $4_2$ the data stored in the vector data storage unit 5 shown in FIG. 1 at the pixel position; and the paint-over pattern data (PB) contained in the bit map data. The overlapping-processed data is written into the processed data register (VW) $4_3$, and then the value of the processed data register $4_3$ is written at the pixel data position in the vector portion data storage unit 5. The overlapping process operation $4_1$ is performed as shown in FIG. 10 based on the value of the overlapping attribute.

The vector portion data storage unit 5 shown in FIG. 1 has a memory for storing the vector portion data, and initializes all the memory values stored in the memory before the vector data and the bit map data are inputted. Next, in accordance with the process operation by the palette producing unit 2, the final palette value and the content of the palette dictionary 9 are written into the memory. Furthermore, in accordance with the process operation by the vector portion data producing unit 4, the pixel position data is read out as the vector portion data read-out value shown in FIG. 7. Also, the data is written at the pixel position as a vector portion data write value.

As indicated in FIG. 8, the bit map portion data producing unit 6 shown in FIG. 1 inputs the bit map data, and then produces the bit map portion data based on the pixel value, the value of the paint-over pattern and the overlapping attribute all of which are contained in the bit map data, and the pixel value stored in the bit map portion data storage unit 8. It should be noted that the pixel value contained in the bit map data and the pixel value stored in the bit map portion data storage unit 8 include the values of colors (C, M, Y, K). With respect to all of the pixel positions which are expressed by the origin, the height and the width contained in the bit map data, an overlapping process operation $6_1$ is carried out using the overlapping attribute for the following two data. That is, the pixel value (BI) and paint-over pattern data (PB) of the bit map data; and a bit map portion data read-out value obtained by reading out to a storage pixel register (BD) $6_2$ the data stored in the bit map portion data storage unit 8 shown in FIG. 1 at the pixel position. Then, the overlapping-processed data is written into a processed-data register (BW) $6_3$. Also, the value of the processed-data register $6_3$ is written at the pixel data position in the bit map portion data storage unit 8. The overlapping process operation $6_1$ is carried out based on the value of the overlapping attribute as explained in FIG. 11.

The bit map portion data storage unit 8 shown in FIG. 1 has a memory for storing the bit map portion data, and initializes all of the memory values stored in the memory before the vector data and the bit map data are inputted. Next, in accordance with the process operation by the bit map portion data storage unit 8, the pixel position data is read out as the bit map portion data read-out value shown in FIG. 8. Also, the data is written at the pixel position as the vector portion data write value.

As explained above, the vector data and the bit map data are once stored in the vector portion data storage unit 5 and the bit map portion data storage unit 8, respectively. Upon receipt of the image output request, the data overlapping operation is carried out by the vector portion data overlapping unit 7 shown in FIG. 1 to output the overlapped data as the image data.

As indicated in FIG. 12, the vector portion data overlapping unit 7 inputs the bit map portion data (C, M, Y, K) which is stored in the bit map portion data storage unit 8 at a position corresponding to the pixel position of the image data output; the vector portion data (palette value) which is stored at the pixel position in the vector portion data storage unit 5; and the bit map palette value. In the palette dictionary $7_2$, the palette dictionary after being read out from the vector portion data storage unit 5 is stored. A bit map palette judgment $7_1$ shown in FIG. 12 judges as to whether or not the palette value indicated by the vector portion data is identical to the bit map palette value, and then outputs the judgment result and the vector portion data. In an output overlapping process $7_3$, in case the bit map palette judgment $7_1$ judges that the palette value of the pixel of the vector portion data is identical to the bit map palette value, the bit map portion data is outputted as the value of the pixel. On the other hand, in case the bit map palette judgment $7_1$ judges that the palette value of the pixel of the vector portion data is not identical to the bit map palette value, the content which is read out from the palette dictionary $7_2$ using the palette value as the address is outputted as the value of the pixel.

As explained above, in accordance with the first embodiment, the vector portion data is represented by the palette value of the vector data and the bit map palette value. Thereby, the storage capacity of the vector portion data can be made small, and the image output from the storage memory can be realized by performing the data overlapping operation only one time.

(Second Embodiment)

Referring now to FIGS. 4, 5, 7–10 and 13–18, a description will be made of an image processing apparatus according to the second embodiment of the present invention.

Figure 13:
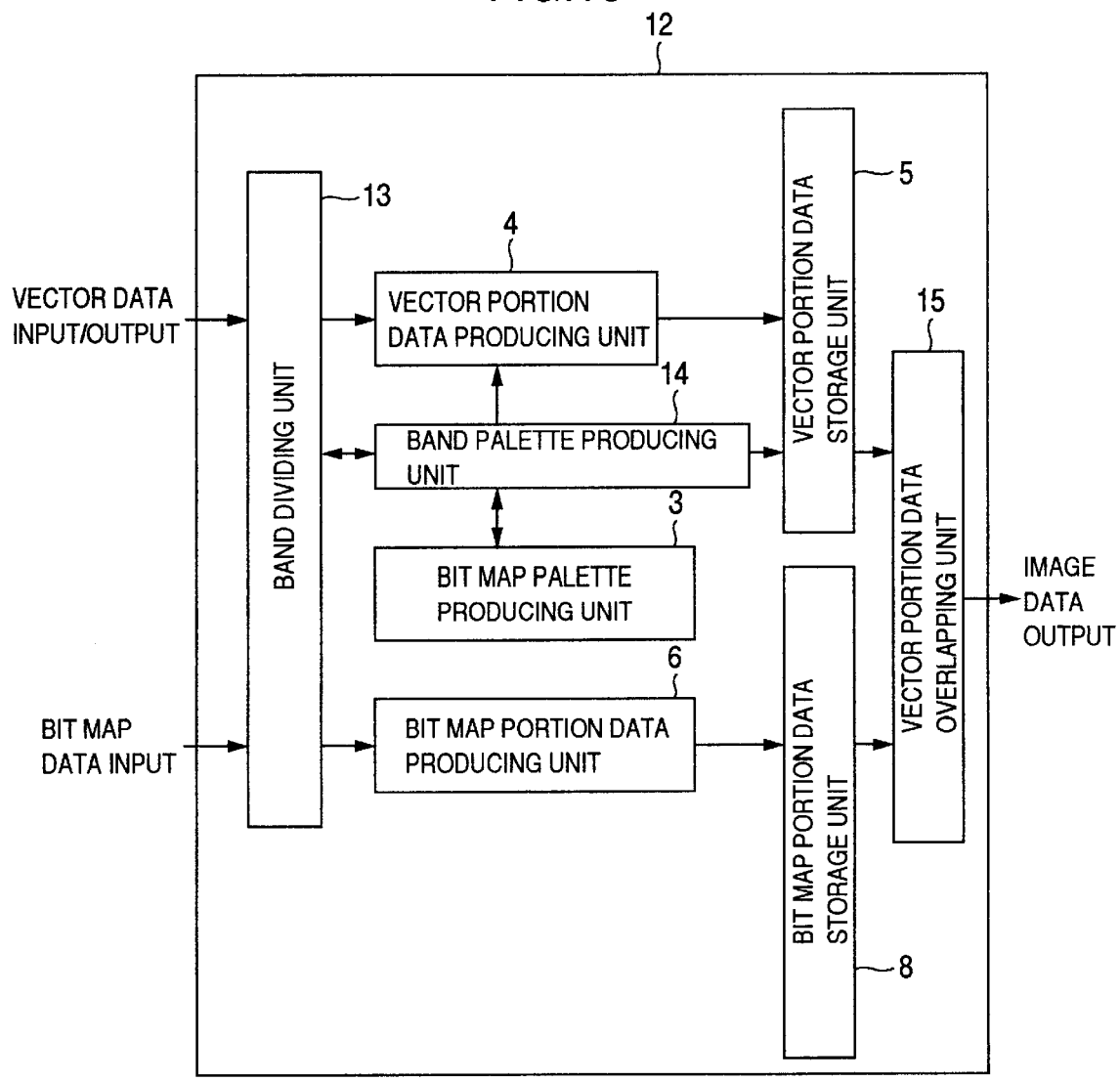
FIG. 13 is a schematic block diagram of an image processing apparatus according to the second embodiment.
Figure 14:
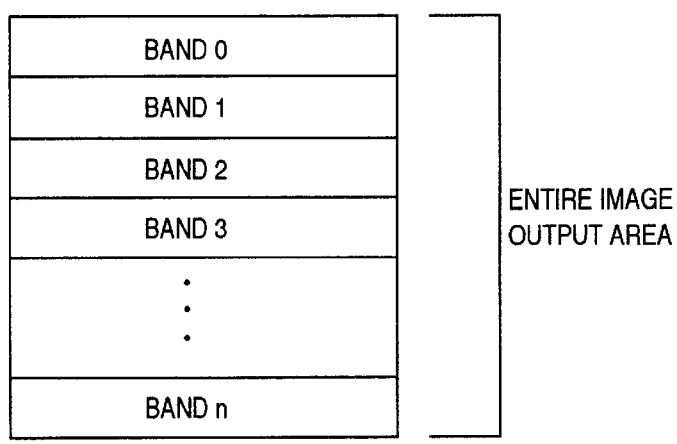
FIG. 14 is a band process diagram of a band dividing unit in the second to fourth embodiments.
Figure 15:
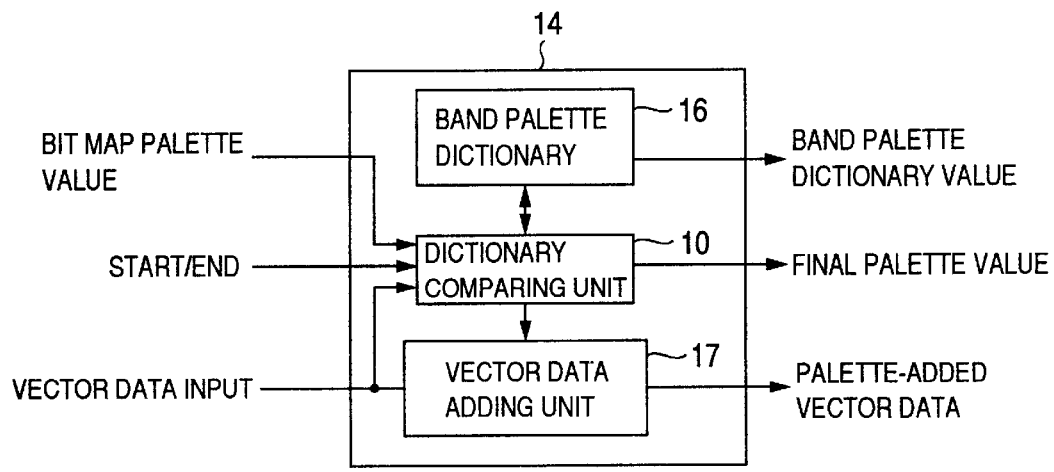
FIG. 15 is a block diagram of a band palette producing unit in the second to fourth embodiments.
Figure 16:
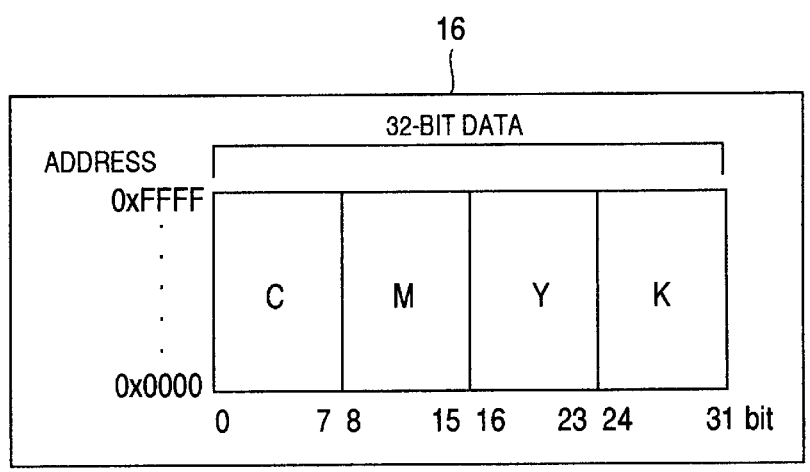
FIG. 16 is a diagram of a band palette dictionary in the second to fourth embodiments.
Figure 17:
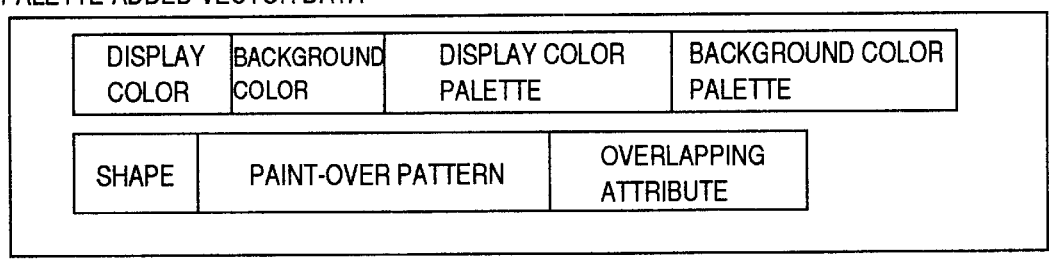
FIG. 17 is a structural diagram of palette-added vector data in the second to fourth embodiments.

FIG. 13 is a block diagram of the image processing apparatus according to the second embodiment of the present invention. In FIG. 13, reference numeral 12 denotes the entire arrangement of the image processing apparatus. The image processing apparatus 12 inputs the vector data and the bit map data of the CMYK color space, and produces the image data output. As indicated in FIG. 5, the vector data has as the content of a vector, color data of a display color and a background color; a shape; a paint-over pattern; and an overlapping attribute. The bit map data has as the content of a bit map, an origin; a width (W); a height (H); an overlapping attribute; a paint-over pattern; and pixel data made of W×H pixels having 4values of C, M, Y and K as pixel values. An input image is combined in the unit of 100 rasters to be handled as a band. As indicated in FIG. 14, an image area is subdivided by a band dividing unit 13 into "0" to "n" ("n" indicates an integer value). The band dividing unit 13 performs the band dividing process operation from the band "0" to the band "n", so that the process for the entire image is completed. The band dividing unit 13 inputs/outputs the vector data and the bit map data both of which are useful for the band area. The band dividing unit 13 outputs a start/end signal when the input/output of the band process operation is commenced/ended. First of all, the vector data input within the band which becomes effective by the band dividing unit 13 is once sent to a band palette producing unit 14 for the data within all bands. As indicated in FIG. 15, the band palette producing unit 14 inputs the vector data input; the bit map palette value produced by the bit map palette producing unit 3 shown in FIG. 13; and the start/end signal produced by the band dividing unit 13. The structure of a band palette dictionary 16 is indicated in FIG. 16. The number of the palettes which can registered is selected to 4,096 defined from 0x000 to 0xFFF. The content of the band palette dictionary 16 is 32-bit data constituted by 8-bit data of C/M/Y/K. The address value of the band palette dictionary 16 is used as the pallet value. A dictionary comparing unit 10 shown in FIG. 15 comprises a palette dictionary read address register $10_1$, a final palette address register $10_2$ and a dictionary comparator $10_3$ as shown in FIG. 4. The dictionary comparing unit 10 has as the input data, the palette dictionary data; the color data for which the two color data of the display color data and the background color data within the vector data are inputted one by one in such a manner that display color data is first inputted and the background color data is subsequently inputted; and the start/end signal. Also, the dictionary comparing unit 10 outputs the palette dictionary address, the final palette value, and the palette value which is obtained from the color data input. The dictionary comparator $10_3$ firstly receives the vector data start signal to perform the initialization operation. In the initialization operation, the value of the final palette address register $10_2$ and the value of the dictionary read address register $10_1$ are set to "0". Next, upon receipt of the vector data input, in order to check as to whether or not the same color data as the color data is present in the palette dictionary 9 using the color data input, the dictionary comparing unit 10 sets the value of the palette dictionary address register $10_1$ from "0" to a value smaller than the value of the final palette address register $10_2$ as the band palette dictionary address, and then compares the C/M/Y/K values of the color data with the C/M/Y/K values of the band palette dictionary data. When the same color data as the color data is present in the band palette dictionary 16, the dictionary comparing unit 10 outputs the address of the band palette dictionary 16 as the palette value, and then accomplishes the dictionary comparing operation to wait for the input of next color data. To the contrary, when the same color data as the color data is not present in the band palette dictionary 16, the dictionary comparing unit 10 writes the color data into the band palette dictionary 16 using the final palette value as the address thereof. Then, the value of the final palette address register $10_2$ is incremented by "1". Using the color data for which the process operation by the dictionary comparing unit 10 has been accomplished as to the display color and the background color, a vector data adding unit 17 shown in FIG. 15 adds the display color palette and the background color palette to the vector data input using the palettes obtained by the dictionary comparing unit 10 to produce palette-added vector data. The palette-added vector data is written back to the vector data input/output. As indicated in FIG. 17, the palette-added vector data is constituted by the display color, the background color, the display color palette, the background color palette, the shape, the paint-over pattern and the overlapping attribute. The band palette producing unit 14 which receives the end signal writes the bit map palette value, which is produced in the bit map palette producing unit 3, to the band palette dictionary 16 using the final palette value as the address, and stores both the final palette value indicative of the dictionary size and the content of the band palette dictionary 16 in the vector portion data storage unit 5 shown in FIG. 13 from the address "0" to the address indicative of the final palette value. Then, the band palette producing unit 14 accomplishes the palette producing operation. The bit map palette producing unit 3 shown in FIG. 13 produces a value obtained by incrementing by "1" the final palette value outputted from the band palette producing unit 14, as the bit map palette value inputted to the palette producing unit 14.

Next, when the palette data production of the band palette dictionary 16 is ended, the vector portion data producing unit shown in FIG. 13 receives from the band dividing unit 13 the palette-added vector data written back by the band palette producing unit 14 and the bit map data as the vector data input and the bit map data input, respectively. Then, the vector portion data production is performed based on the palette values. As indicated in FIG. 7, the vector portion data production is performed in the vector portion data producing unit 4 using the display color palette, the background color palette, the shape, the paint-over pattern and the overlapping attribute shown in FIG. 17 of the palette-added vector data received from the band dividing unit 13, and the bit map palette value obtained by the bit map palette producing unit 3 instead of the origin, the width, the height, the overlapping attribute and the pixel data of the bit map data input shown in FIG. 5. The vector portion data producing unit 4 inputs the palette-added vector data, the bit map data and the bit map palette value. The palette-added vector data and the bit map data are processed in the input order. When the palette-added vector data is inputted, the overlapping process operation $4_1$ is carried out using the overlapping attribute for the following three data. That is, the value (S) at the pixel position obtained by binary-expanding the shape, the display color palette (F), and the background color palette (B); the vector portion data read-out value obtained by reading out to the storage pixel register (VD) $4_2$ the data stored at the pixel position in the vector data storage unit 5 shown in FIG. 13; and the paint-over pattern data (PV). The overlapping-processed data is written into the processed data register (VW) $4_3$, and the value of the processed data register $4_3$ is written at the pixel data position in the vector portion data storage unit 5. The overlapping process operation $4_1$ is performed based on the value of the overlapping attribute as shown in FIG. 9. When the bit map data is inputted, with respect to the pixel in the area defined by the origin, the height and the width, the overlapping process operation $4_1$ is carried out using the overlapping attribute for the following three data. That is, the bit map palette value (BP) produced by the bit map palette producing unit 3; the vector portion data read-out value obtained by reading out to the storage pixel register (VD) $4_2$ the data stored at the pixel position in the vector portion data storage unit 5 shown in FIG. 13; and the paint-over pattern data (PB) contained in the bit map data. The overlapping-processed data is written into the processed data register (VW) $4_3$, and the value of the processed data register $4_3$ is written at the pixel data position in the vector portion data storage unit 5. The overlapping process operation $4_1$ is performed as shown in FIG. 10 based on the value of the overlapping attribute.

The vector portion data storage unit 5 shown in FIG. 13 has a memory for storing the vector portion data, and initializes all the memory values stored in the memory before the vector data and the bit map data are inputted. Next, in accordance with the process operation by the palette producing unit 14, the final palette value and the content of the band palette dictionary 16 are written into the memory. Furthermore, in accordance with the process operation by the vector portion data producing unit 4, the pixel position data is read out as the vector portion data read-out value shown in FIG. 7. Also, the data is written at the pixel position as the vector portion data write value.

As indicated in FIG. 8, the bit map portion data producing unit 6 shown in FIG. 13 inputs the bit map data, and then produces the bit map portion data based on the pixel value, the value of the paint-over pattern and the overlapping attribute which are contained in the bit map data, and the pixel value stored in the bit map portion data storage unit 8. It should be noted that the pixel value contained in the bit map data and the pixel value stored in the bit map portion data storage unit 8 have the values of colors (C, M, Y, K). With respect to all of the pixel positions which are expressed by the origin, the height and the width contained in the bit map data, the overlapping process operation $4_1$ is carried out using the overlapping attribute for the following two data. That is, the pixel value (BI) and the paint-over pattern data (PB) of the bit map data; and the bit map portion data read-out value which is produced by reading out to the storage pixel register (BD) $4_2$ the data stored at the pixel position in the bit map portion data storage unit 8 shown in FIG. 13. Then, the overlapping-processed data is written into the processed-data register (BW) $4_3$, and the value of the processed-data register $4_3$ is written at the pixel data position of the bit map portion data storage unit 8. The overlapping process operation $4_1$ is carried out based on the value of the overlapping attribute as shown in FIG. 11.

The bit map portion data storage unit 8 shown in FIG. 13 has a memory for storing the bit map portion data, and initializes all of the memory values stored in the memory before the vector data and the bit map data are inputted. Next, in accordance with the process operation by the bit map portion data producing unit 6, the pixel position data is read out as the vector portion data read-out value shown in FIG. 8. Also, the data is written into the pixel position as the vector portion data write value.

As explained above, the vector data and the bit map data are once stored into the vector portion data storage unit 5 and the bit map portion data storage unit 8, respectively. Upon receipt of the image output request, the data overlapping operation is carried out every band by the vector portion data overlapping unit 15 shown in FIG. 13 to output the overlapped data as the image data.

Figure 18:
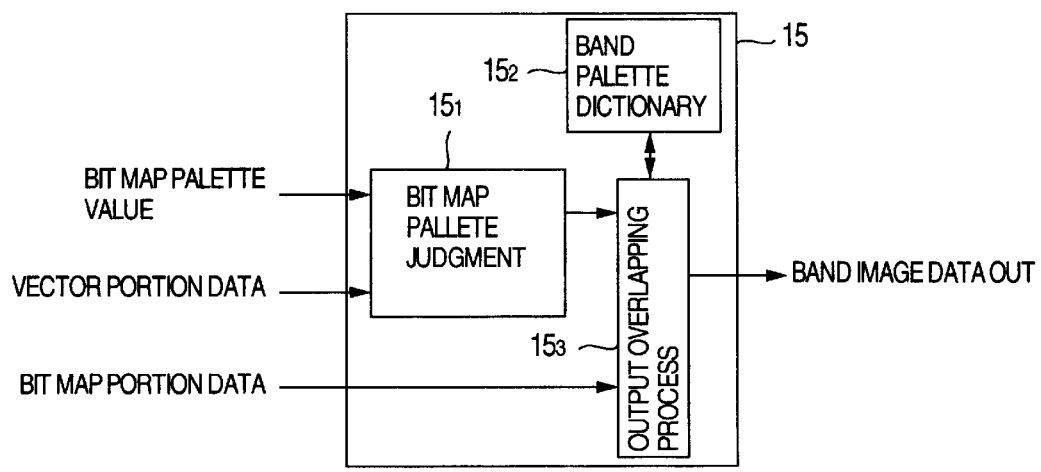
FIG. 18 is a structural diagram of a vector portion data overlapping unit in the second to fourth embodiments.

As indicated in FIG. 18, the vector portion data overlapping unit 15 inputs the bit map portion data (C, M, Y, K) stored at the pixel position of the band image data output in the bit map portion data storage unit 8, the vector portion data (palette value) stored at the pixel position in the vector portion data storage unit 5, and the bit map palette value at the band position (the final address of the band palette dictionary). Also, the band palette dictionary data of the band to be outputted, after being read out from the vector portion data storage unit 5 is stored in the band palette dictionary $15_2$. The bit map palette judgment $15_1$ judges as to whether or not the palette value indicated by the vector portion data is identical to the bit map palette value of the band, and then outputs the judgment result and the vector portion data. In the output overlapping process $15_3$, in case the bit map palette judgment $15_1$ judges that the palette value of the pixel of the vector portion data is identical to the bit map palette value of the band, the bit map portion data is outputted as the value of the pixel. On the other hand, the bit map palette judgment $15_1$ judges that the palette value of the pixel of the vector portion data is not identical to the bit map palette value of the band, the content read out from the band palette dictionary $15_2$ using the palette value as the address is outputted as the value of the pixel. By performing the output overlapping process operation for the band image data from the band "0" to the band "n", the image processing apparatus 12 shown in FIG. 13 can obtain the image data output.

As described above, in accordance with the second embodiment, the input image data is represented by the palette value of the vector data and the bit map palette value every band, and also the band palette dictionary is produced every band. As a consequence, the size of the palette dictionary can be made small, and the storage capacity of the vector data represented by the palette produced from the palette dictionary can be reduced. The output from the storage memory is carried out by only one overlapping operation.

(Third Embodiment)

Referring now to FIGS. 4, 5, 7–11, 14–17 and 19–34, a description will now be made of an image processing apparatus according to the third embodiment of the present invention.

Figure 19:
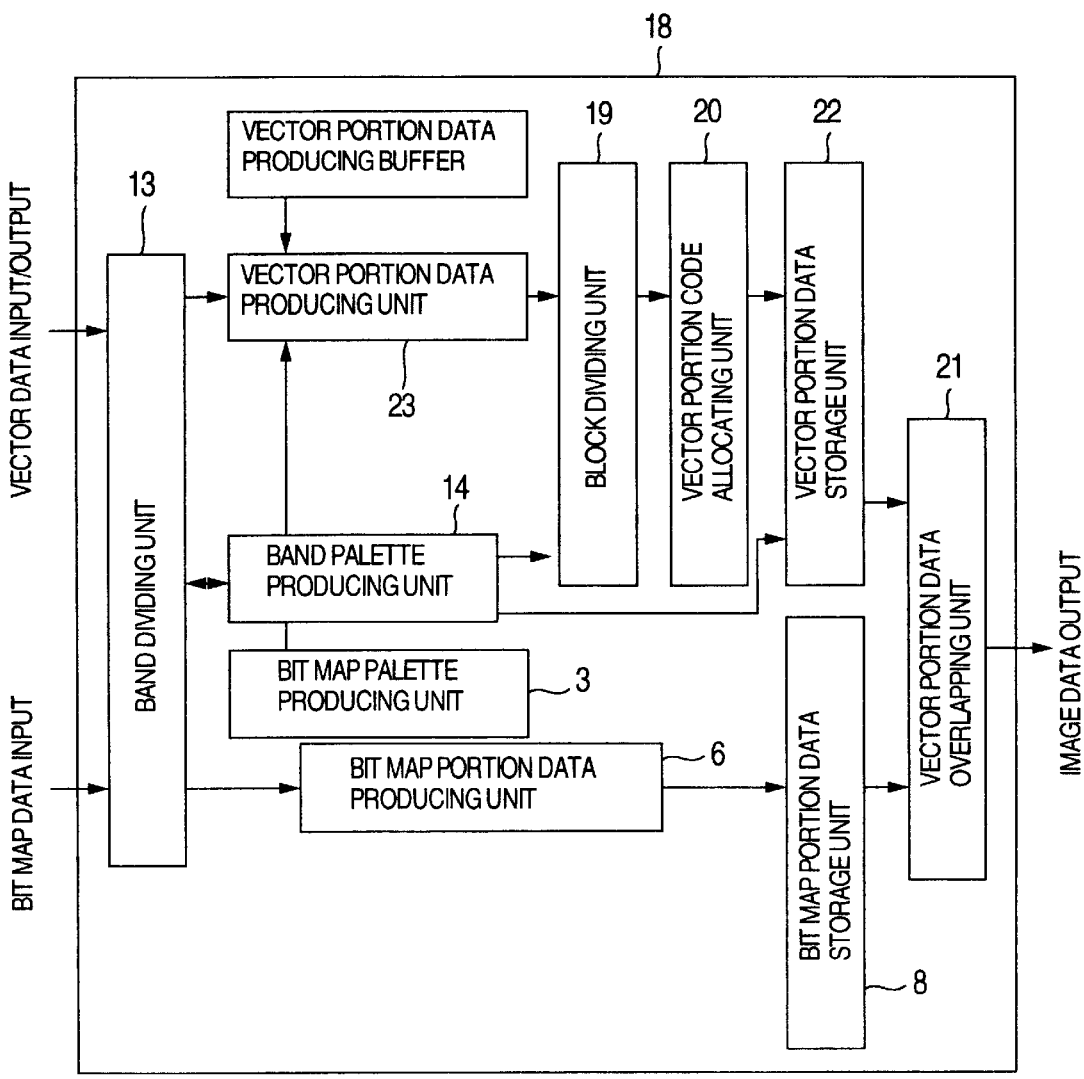
FIG. 19 is a block diagram of an image processing apparatus according to the third embodiment.

FIG. 19 is a block diagram of the image processing apparatus according to the third embodiment of the present invention. In FIG. 19, reference numeral 18 denotes the entire arrangement of the image processing apparatus. The image processing apparatus 18 inputs the vector data and bit map data of the CMYK color space, and produces the image data output. As indicated in FIG. 5, the vector data has as the content of the vector, the color data of the display color and the background color; the shape; the paint-over pattern; and the overlapping attribute. Also, the bit map data has as the content thereof, the origin; the width (W); the height (H); the overlapping attribute; the paint-over pattern; and the pixel data of W×H pixels having 4 values of C, M, Y and K as the pixel values. The input image is combined in the unit of 100 rasters to be handled as a band. As indicated in FIG. 14, the image area is handled to be subdivided by a band dividing unit 13 into "0" to "n" ("n" indicates an integer value). The band dividing unit 13 performs the band dividing process operation from the band "0" to the band "n", so that the band dividing process operation for the entire image is completed. The band dividing unit 13 inputs/outputs the vector data and the bit map data which are useful for the band area. The band dividing unit 13 outputs the start/end signal when the input/output of the band process operation is commenced/ended. First of all, the vector data input within the band which becomes effective by the band dividing unit 13 is once sent to a band palette producing unit 14 as to the data within all bands. As indicated in FIG. 15, the band palette producing unit 14 inputs the vector data input; the bit map palette value produced by the bit map palette producing unit 3 shown in FIG. 19; and the start/end signal produced by the band dividing unit 13. The structure of a band palette dictionary 16 is indicated in FIG. 16. The number of the palettes which can be registered is selected to 4,096 defined from 0x000 to 0xFFF. The content of the band palette dictionary is 32-bit data constituted by 8-bit data of C/M/Y/K. The address value of the band palette dictionary is used as the pallet value. A dictionary comparing unit 10 shown in FIG. 15 comprises a palette dictionary read address register $10_1$, a final palette address register $10_2$ and a dictionary comparator $10_3$ as shown in FIG. 4. The dictionary comparing unit 10 inputs the palette dictionary data; the color data for which two color data of the display color data and the background color data within the vector data are inputted one by one in such a manner that the display color data is first inputted and the background color data is subsequently inputted; and the start/end signal. Also, the dictionary comparing unit 10 outputs the palette dictionary address; the final palette value; and the palette value obtained from the color data input. The dictionary comparator $10_3$ firstly receives the vector data start signal to perform the initialization operation. In the initialization operation, the value of the final palette address register $10_2$ and the value of the dictionary read address register $10_1$ are set to "0". Next, upon receipt of the vector data input, in order to check as to whether or not the same color data as the color data is present in the palette dictionary 16 using the color data input, the dictionary comparing unit 10 sets the band palette dictionary address as the palette dictionary address of the value of the palette dictionary read address register $10_1$ from "0" to a value smaller than the value of the final palette address register $10_2$, and then compares the C/M/Y/K values of the color data with the C/M/Y/K values of the palette dictionary data. When the same color data as the color data is present in the band palette dictionary 16, the dictionary comparing unit 10 outputs the address of the band palette dictionary 16 as the palette value, and then accomplishes the dictionary comparing operation to wait for next color data input. To the contrary, when the same color data as the color data is not present in the band palette dictionary 16, the dictionary comparing unit 10 writes the color data into the band palette dictionary 16 using the final palette value as the address thereof, and increments the value of the final palette address register $10_2$ by "1". Using the color data for which the process operation of the dictionary comparing unit 10 has been accomplished as to the display color and the background color, the vector data adding unit 17 shown in FIG. 15 adds the display color palette and the background color palette to the vector data input using the palette obtained by the dictionary comparing unit 10. Then, the vector data adding unit 17 writes it back to the vector data input/output as the palette-added vector data. As indicated in FIG. 17, the palette-added vector data to be written back is constituted by the display color; the background color; the display color palette; the background color palette; the shape; the paint-over pattern; and the overlapping attribute. The band palette producing unit 14 which receives the end signal writes the bit map palette value produced by the bit map palette producing unit 3, into the band palette dictionary 16 using the final palette value as the address, and stores the final palette value indicative of the dictionary size and the content of the band palette dictionary 16 into the vector portion data storage unit 22 shown in FIG. 19 from the address "0" to the address indicative of the final palette value. Then, the band palette producing unit 14 accomplishes the palette producing operation. The bit map palette producing unit 3 shown in FIG. 19 produces the value which is obtained by incrementing by "1" the final palette value outputted from the palette producing unit 2, as the bit map palette value which constitutes the input to the palette producing unit 14.

Next, when the production of the band palette dictionary 16 is ended, the vector portion data producing unit 23 shown in FIG. 19 receives from the band dividing unit 13 the palette-added vector data which is written back by the band palette producing unit 14, and the bit map data as the vector data input and the bit map data input, respectively, to perform the vector portion data production based on the palette values. The vector portion data production is performed by the vector portion data producing unit 23 using the display color palette, the background color palette, the shape, the paint-over pattern and the overlapping attribute of the palette-added vector data shown in FIG. 17 received from the band dividing unit 13, and the bit map palette value obtained from the bit map palette producing unit 3 instead of the origin, the width, the height, the overlapping attribute and the pixel value of the bit map data input shown in FIG. 5. The vector portion data producing unit 23 inputs the palette-added vector data, the bit map data and the bit map palette value. The palette-added vector data and the bit map data are processed in the input order. When the palette-added vector data is inputted, the overlapping process operation $4_1$ is carried out using the overlapping attribute for the following three data. That is, the value (S) at the pixel position obtained by binary-expanding the shape, the display color palette (F), and the background color palette (B); the vector portion data read-out value obtained by reading out the data stored at the pixel position in the vector data portion data producing buffer shown in FIG. 19, to the storage pixel register (VD) $4_2$; and the paint-over pattern data (PV). The overlapping-processed data is written into the processed data register (VW) $4_3$, and the value of the processed data register $4_3$ is written at the pixel data position in the vector portion data producing buffer. The overlapping process operation $4_1$ is performed as shown in FIG. 9 based on the value of the overlapping attribute. When the bit map data is inputted, with respect to the pixel in the area defined by the origin, the height and the width, the overlapping process operation $4_1$ is carried out using the overlapping attribute for the following three data. That is, the bit map palette value (BP) produced by the bit map palette producing unit 3; the vector portion data read-out value obtained by reading the data stored at the pixel position in the vector portion data producing buffer shown in FIG. 13, to the storage pixel register (VD) 42; and the paint-over pattern data (PB) of the bit map data. The overlapping-processed data is written into the processed data register (VW) $4_3$, and the value of the processed data register (VW) $4_3$ is written at the pixel data position in the vector portion data producing buffer. The overlapping process operation 41 is performed as shown in FIG. 10 based on the value of the overlapping attribute. The vector portion data producing buffer is a memory having the storage capacity of (the total pixel number within the band×the bit number of the palette). Upon receipt of the start signal, all of the data are set to "0" by the vector portion data producing unit 23. Upon receipt of the end signal, the vector portion data producing unit 23 transfers the data stored in the vector portion data producing buffer, to the block dividing unit 19 show in FIG. 19.

Figure 20:
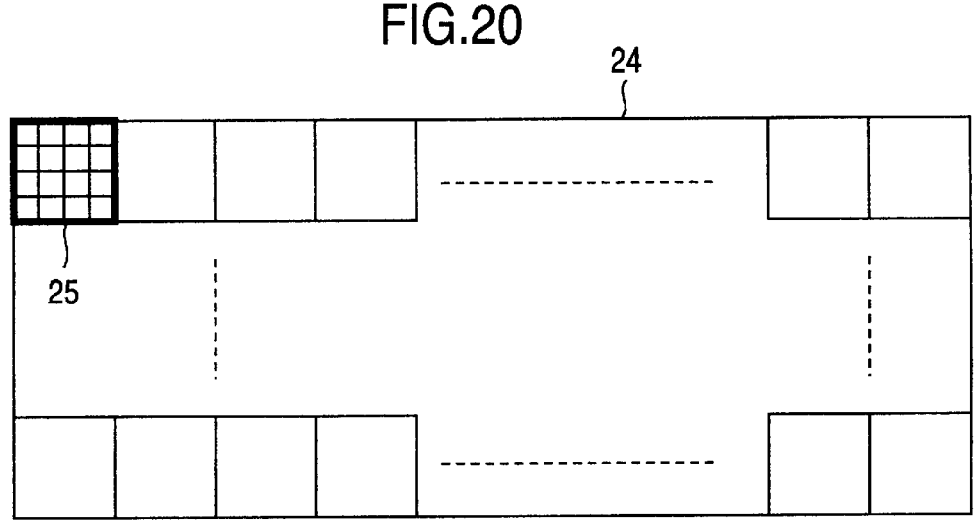
FIG. 20 is a diagram for schematically indicating an example of a block dividing process operation in the third embodiment.

In the block dividing unit 19, as shown in FIG. 20, the vector portion producing buffer data 24 which is drawn by the palette value in the band is subdivided into 4×4 pixels of block data 25. The blocked data is supplied to a vector portion code allocating unit 20 shown in FIG. 19.

Figure 21:
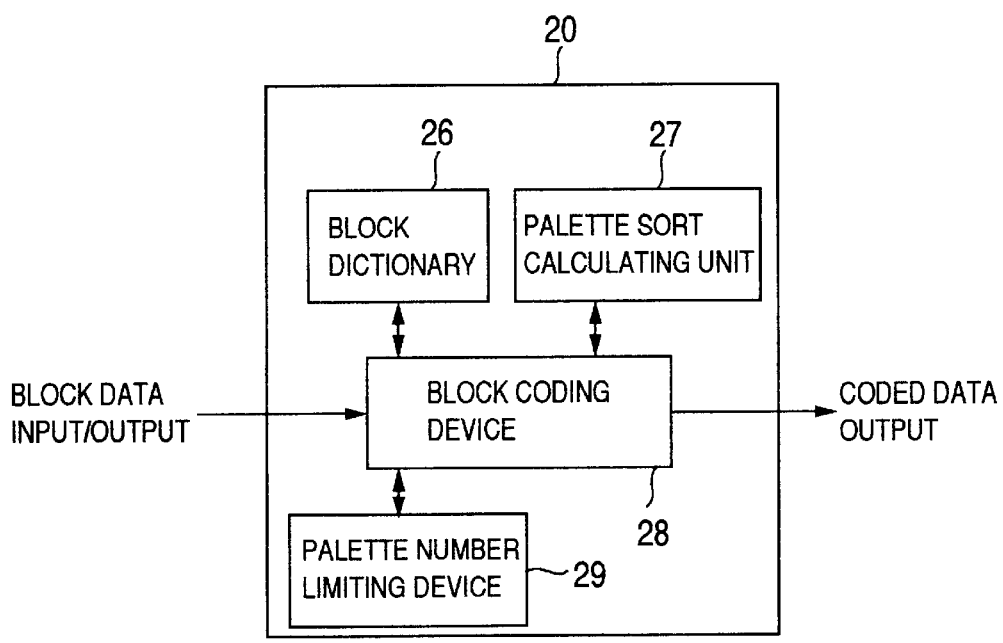
FIG. 21 is a block diagram of a vector portion code allocating unit in the third embodiment.
Figure 22:
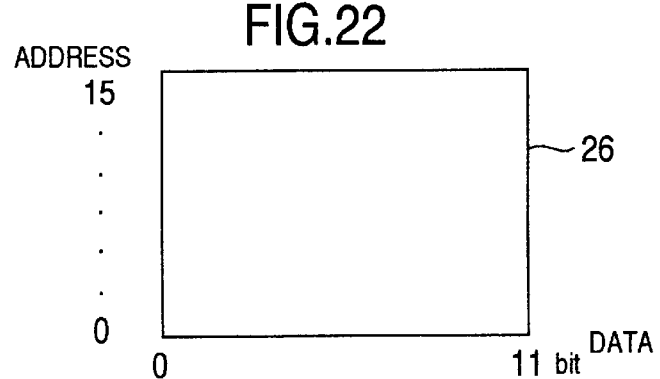
FIG. 22 is a structural diagram of a block dictionary in the third embodiment.
Figure 32:
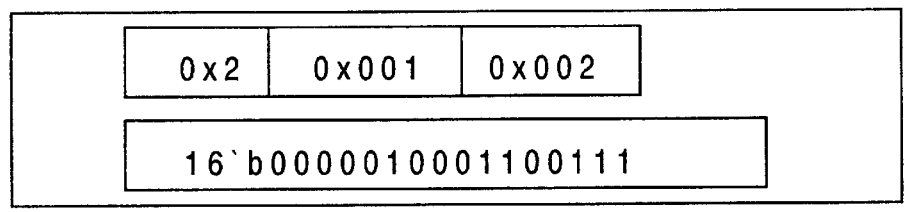
FIG. 32 is a diagram indicating an example of a coded data output structure in the third embodiment.
Figure 33:
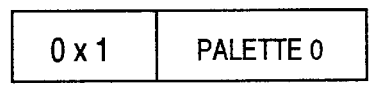
FIG. 33 is a structural diagram of a coded data output in case a value of a palette counter is equal to "1" in the third embodiment.

FIG. 21 shows a block diagram of the vector portion code allocating unit 20. The vector portion code allocating unit 20 comprises a block dictionary 26, a palette sort calculating unit 27, a block coding device 28 and a palette number limiting unit 29. The blocked data is coded by the block coding device 28, and then is sent as a coded data output to a vector portion data storage unit 22 shown in FIG. 19. In the block coding device 28, upon receipt of the blocked data input, the block dictionary 26 is produced, and the calculation of the palette sort and the production of the occurrence frequency of the palette sort are performed in the palette sort calculating unit 27. As shown in FIG. 22, the block dictionary 26 is a dictionary having a 12-bit data width indicative of the palette value, and a plurality of addresses whose number is equal to the number of pixels contained in the block. Even when all of these pixels in the block have the different palette values from each other, the dictionary can be produced. As shown in FIG. 23, the palette sort calculating means 27 comprises a frequency degree memory $27_1$ having addresses "0" to "15", and a palette number counter $27_2$. As indicated in FIG. 24, the palette number limiting unit 29 comprises a palette number limiting register $30_1$ and a palette number converting device $30_2$. Every time the block data is inputted, the block coding device 28 firstly sets "0" to the content of the frequency degree memory $27_1$ and the content of the palette number counter $27_2$ in the palette sort calculating unit 27. Next, every time one pixel of the block data input is received, the block coding device 28 compares it with the palette values in the block dictionary 26 from the address "0" to the address smaller than the address indicated by the palette number counter $27_2$ of the palette sort calculating unit 27. When the palette value of the block data input is identical to the palette value in the block dictionary 26, the block coding device 28 increments the value of the frequency degree memory in the sort calculating unit 27 by "1" at the same address as that contained in the block dictionary 26. To the contrary, when the palette value of the block data input is not identical to the palette value in the block dictionary 26, the block coding device 28 registers the palette value of the block data input into the block dictionary using the count value of the palette number counter $27_2$ as the address, increments the value of the frequency degree memory in the sort calculating unit 27 by "1" at the same address as the palette number counter value, and increments the value of the palette number counter $27_2$ by "1". Therefore, the block dictionary 26, the palette number and the occurrence frequency degree of the palette are produced. Thereafter, the block coding device 28 again inputs the block data from the beginning to code the inputted block data. In case the value of the palette number counter $27_2$ indicative of the sort of the produced palette shown in FIG. 23 is larger than the value of the palette number limiting register $30_1$ in the palette number unit 29, the palette number converter 30 converts the lowest occurrence frequency degree among the data stored in the frequency degree memory $27_1$ in the palette sort calculating unit 27 into the palette value which is not equal to the palette value of the pixel and has the largest number of the palette values among the palette values in the blocks located adjacent to the pixel. Then, the block coding device 28 writes back the converted palette value into the block data input/output, restarts the process operation of producing the block dictionary, and repeatedly performs this process operation until the value of the palette number counter $27_2$ indicative of the produced palette sort shown in FIG. 23 becomes equal to the value of the palette number limit register $30_1$ of the palette number limiting unit 29. In case the value of the palette number counter $27_2$ indicative of the sort of the produced palette shown in FIG. 23 is smaller than, or equal to the value of the palette number limiting register $30_1$ in the palette number unit 29, and the value of the palette number counter $27_2$ is larger than "1", the block coding device 28 outputs the following data as the pixel code data. That is, the value of the palette number counter $27_2$; the data stored at the address "0" to the address smaller than the value of the palette number counter $27_2$ in the block dictionary 26; the lower "a"-bit of the address of the data in the block dictionary 26 which indicates the same value as the palette value of the input data using "a" which satisfies the following formula when the value indicated by the palette number counter $27_2$ is equal to "m":

$$(2^{(a+1)}) > m >= (2^a)$$

where "n" shows an integer, and x^y indicates $x^y$. The contents of the coded data output are illustrated in FIG. 31. Data indicated as palettes "0", "1", - - - , corresponds to the data of the block dictionary addresses "0", "1", - - - . Also, when the value of the palette number counter $27_2$ is equal to "1", namely when there are only one sort of palettes within the block, the block coding device 28 subtracts the pixel code data from the data shown in FIG. 31, and outputs the subtracted pixel code data as the code as shown in FIG. 33. The operation will now be explained with reference to FIGS. 25–32. It is assumed that as the block input shown in FIG.

25, the value of the palette number limiting register $30_1$ is set to "2". Then, the block coding device 28 produces the block dictionary 26 shown in FIG. 26. As the minimum occurrence degree of the palette values, it is 0x003. Here, "0x" indicates that the numeral value subsequent to this "0x" is expressed by hexadecimal notation. As indicated in FIG. 27, the palette value having the largest occurrence degree except for 0x003 is 0x001 located adjacent to 0x003. Therefore, the value of 0x003 is rewritten into 0x001 by the palette number converter 28, so that the converted palette number is obtained as shown in FIG. 28. The block coding device 28 again produces the block dictionary 26 using the written-back block data show in FIG. 29, and the content of the block dictionary 26 having only the data of 0x001 and 0x002 shown in FIG. 26 is produced. Also, the value of the palette number counter $27_2$ also becomes "2" which may satisfy the limit value of the palette number register $30_1$. Then, the coding operation is carried out using the block dictionary 26 to produce the pixel code data as shown in FIG. 30. In this case, x'b shows that x pieces of binary notification data succeed to this symbol x'b. As a consequence, the coded data output to be produced is represented in FIG. 32.

The vector portion data storage unit 22 shown in FIG. 19 has a memory for storing the vector portion data, and initializes all memory values stored in the memory before the vector data and the bit map data are inputted. Next, in accordance with the process by the palette producing unit 14, the vector portion data storage unit 22 writes the final palette value and the content of the band palette dictionary 16 into the memory. Furthermore, the vector portion data storage unit 22 writes the content of the coded data outputted from the vector portion code allocating unit 20, into the memory.

As indicated in FIG. 8, the bit map portion data producing unit 6 shown in FIG. 19 inputs the bit map data, and then produces the bit map portion data based on the pixel value, the value of the paint-over pattern and the overlapping attribute which are contained in the bit map data, and the pixel value stored in the bit map portion data storage unit 8. It should be noted that the pixel value of the bit map data, and the pixel value stored in the bit map portion data storage unit 8 have the values of colors (C, M, Y, K). With respect to all of the pixel positions which are expressed by the origin, the height and the width of the bit map data, the overlapping process operation $4_1$ is carried out using the overlapping attribute for the following tow data. That is, the pixel value (BI) and the paint-over pattern data (PB) of the bit map data; and the bit map portion data read-out value obtained by reading out to the storage pixel register (BD) $6_2$ the data stored at the pixel position in the bit map portion data storage unit 8 shown in FIG. 19. The overlapping-processed data is written into the processed-data register (BW) $6_3$, and then the value of the processed-data register (BW) $6_3$ is written at the pixel data position in the bit map portion data storage unit 8. The overlapping process operation $6_1$ is carried out based on the value of the overlapping attribute as shown in FIG. 11.

The bit map portion data storage unit 8 shown in FIG. 19 comprises a memory for storing the bit map portion data, and initializes all memory values stored in the memory before the vector data and the bit map data are inputted. Next, in accordance with the process by the bit map portion data producing unit 6, the pixel position data is read out as the vector portion data read-out value shown in FIG. 8, and the data is written at the pixel position as the vector portion data write value.

As explained above, the vector data and the bit map data are once stored into the vector portion data storage unit 5 and the bit map portion data storage unit 8, respectively. Upon receipt of the image output request, the data are overlapped with each other by the vector portion data overlapping unit 21 shown in FIG. 19 to thereby output the overlapped data as the image data.

Figure 34:
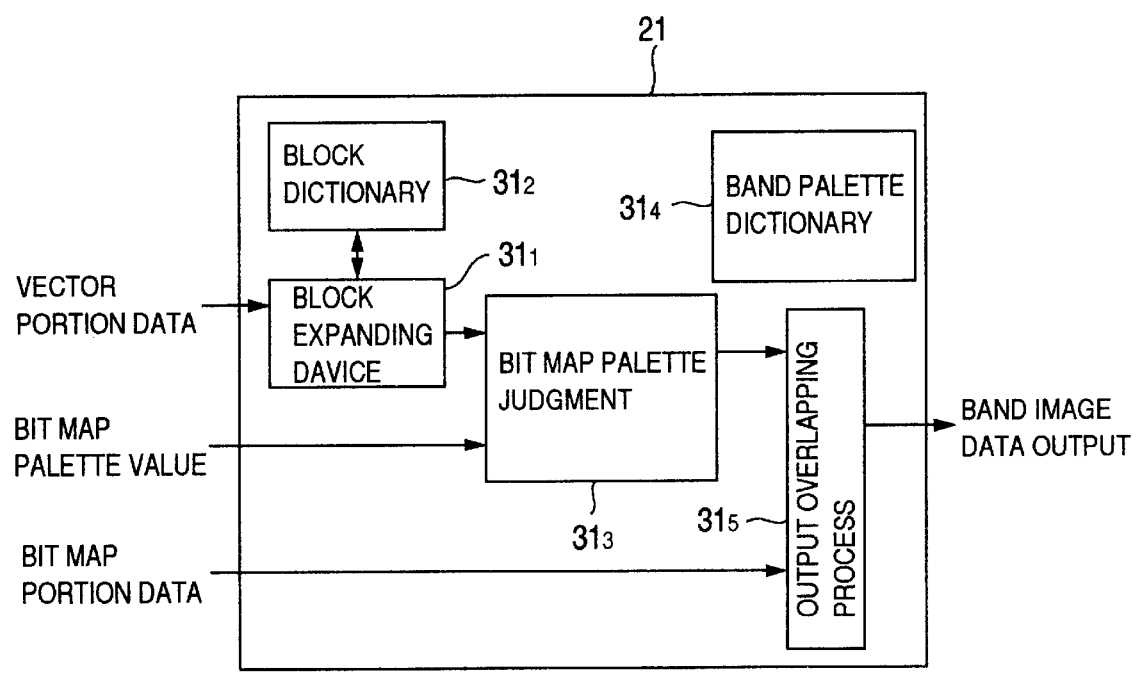
FIG. 34 is a block diagram of a vector portion data overlapping unit in the third embodiment.

As indicated in FIG. 34, the vector portion data overlapping unit 21 inputs the bit map portion data (C, M, Y, K) stored at the pixel position of the band image output data in the bit map portion data storage unit 8; the block coded data of the vector portion data stored at the position including the pixel position in the vector portion data storage unit 22; and the bit map palette value at the band position (the final address of the band palette dictionary). In the band palette dictionary $31_4$, the band palette dictionary data of the band to be outputted is stored after being read out from the vector portion data storage means 22. Regarding the block coded data of the vector portion, when the number of codes derived from the block data shown in FIG. 31 is equal to "1", one palette value is derived from the data subsequent to the block data, and then is written at the address "0" in the block dictionary $31_2$ shown in FIG. 34, and the storage value at the address "0" is expanded to 16 values by the block expanding device $31_1$. On the other hand, when the number of codes is equal to any number other than "1", a plurality of palette values the number of which is equal to the code number are read out from the subsequent code, and then are sequentially registered from the address "0" of the block dictionary $31_2$. In case the value indicative of the code number is equal to "b", 16 pieces of data are derived from the code data every the bit number which is shown by the value of "a" which may satisfy the following formula:

$$(2^{\char`\^}(a+1))>(b-1)>=(2^{\char`\^}a)$$

where "n" is an integer number, and x^y indicates $x^y$. The content of the block dictionary $31_2$ using the each data as the address is supplied as the palette value of the pixel to the bit map palette judgement $31_3$. The bit map palette judgment $31_3$ judges as to whether or not the palette value sent from the block expanding device $31_1$ is identical to the bit map palette value of the band, and then outputs the judgment result and the vector portion data. In an output overlapping process $31_5$, in case the bit map palette judgment $31_3$ judges that the palette value of the pixel of the vector portion data is identical to the bit map palette value, the bit map portion data is outputted as the value of the pixel. On the other hand, in case the bit map palette judgment $31_3$ judges that the palette value of the pixel of the vector portion data is not identical to the bit map palette value of the band, the content of the data read from the band palette dictionary $31_4$ using the palette value as the address is outputted as the value of the pixel. By performing the process of the band image data from the band "0" to the band "n", the image processing apparatus 18 shown in FIG. 19 can obtain the image data.

As described above, in accordance with the third embodiment, the input image data is represented by the palette value of the vector data and the bit map palette value every band, and also the band palette dictionary is produced every band. As a consequence, the size of the palette dictionary can be made small, and therefore, the storage capacity of the vector data represented by the palette, which is produced from the palette dictionary, can be reduced by dividing the block within the band to code the blocks. The image output from the storage memory is merely overlapped with each other only one time.

(Fourth Embodiment)

Referring now to FIGS. 4, 5, 7–11, 14–18 and 35–38, a description will now be made of an image processing apparatus according to the fourth embodiment of the present invention.

Figure 35:
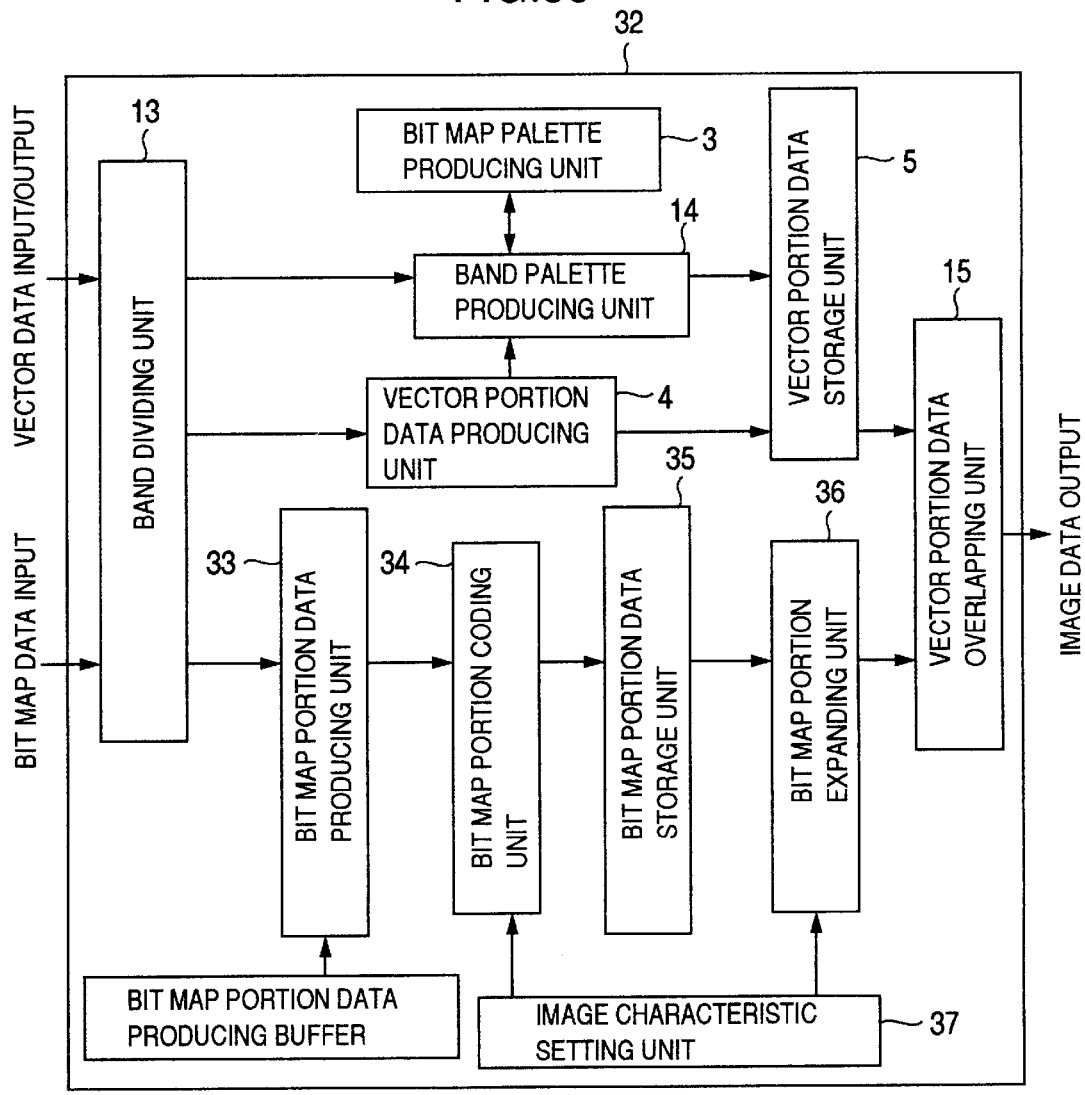
FIG. 35 is a block diagram of an image processing apparatus according to the fourth embodiment of the present invention.

FIG. 35 is a block diagram of the image processing apparatus according to the fourth embodiment. In FIG. 35, reference numeral 32 denotes the entire arrangement of the image processing apparatus. The image processing apparatus 32 inputs the vector data and the bit map data of the CMYK color space, and produces the image data output. As indicated in FIG. 5, the vector data has as the content of the vector, the color data of the display color and the background color; the shape; the paint-over pattern; and the overlapping attribute. The bit map data has as the content of the bit map, the origin; the width (W); the height (H); the overlapping attribute; the paint-over pattern; and the pixel data made of W×H pixels having 4 values of C, M, Y, K as the pixel values. The input image is combined in the unit of 100 rasters to be handled as the band. As indicated in FIG. 14, the image area is handled to be subdivided by a band dividing unit 13 into "0" to "n" ("n" indicates an integer value). The band dividing unit 13 performs the band dividing process operation from the band "0" to the band "n", so that the band dividing process operation for the entire image is completed. The band dividing unit 13 inputs/outputs the vector data and the bit map data both of which are useful for the band area. The band dividing unit 13 outputs the start/end signal when the input/output of the band process operation is commenced/ended. First of all, the vector data input within the band which become effective by the band dividing unit 13 are once sent to the band palette producing unit 14 as to the data within all bands. As indicated in FIG. 15, the band palette producing unit 14 inputs the vector data input; the bit map palette value produced by the bit map palette producing unit 3 shown in FIG. 35; and the start/end signal produced by the band dividing unit 13. The structure of the band palette dictionary 16 is indicated in FIG. 16. The number of the palettes which can be registered is selected to 4,096 defined from 0x000 to 0xFFF. The content of the band palette dictionary is 32-bit data constituted by 8-bit data of C/M/Y/K. The address value of the band palette dictionary is used as the pallet value. The dictionary comparing unit 10 shown in FIG. 15 comprises, as shown in FIG. 4, the palette dictionary read address register $10_1$, the final palette address register $10_2$ and the dictionary comparator $10_3$. The dictionary comparing unit 10 inputs the palette dictionary data; the color data for which two color data of the display color data and the background color data in the vector data are inputted one by one in such a manner that the display color data is first inputted and the background color data is subsequently inputted; and the start/end signal. Also, the dictionary comparing unit 10 outputs the palette dictionary address; the final palette value; and the palette value obtained from the color data input. The dictionary comparator $10_3$ firstly receives the vector data start signal to perform the initialization operation. In the initialization operation, the value of the final palette address register $10_2$ and the value of the dictionary read address register $10_1$ are set to "0". Next, upon receipt of the vector data input, in order to check as to whether or not the same color data as the color data is present in the band palette dictionary 16 using the color data input, the dictionary comparing unit 10 sets the band palette dictionary address as the palette dictionary address of the value of the palette dictionary read address register $10_1$ from "0" to a value smaller than the value of the final palette address register $10_2$, and then compares the C/M/Y/K values of the color data with the C/M/Y/K values of the band palette dictionary data. When the same color data as the color data is present in the band palette dictionary 16, the address of the band palette dictionary 16 is outputted as the palette value, and then the dictionary comparing operation is accomplished to wait for the input of next color data. To the contrary, when the same color data as the color data is not present in the band palette dictionary 16, the color data is written into the band palette dictionary 16 using the final palette value as the address of the band palette dictionary 16, and the value of the final palette address register $10_2$ is incremented by "1". Using the color data for which the process by the dictionary comparing means 10 has been accomplished as to the display color and the background color, the vector data adding unit 17 shown in FIG. 15 adds the display color palette and the background color palette to the vector data input with the palette obtained by the dictionary comparing unit 10. Then, the palette-added vector data is written back to the vector data input/output. As indicated in FIG. 17, the palette-added vector data to be written back is constituted by the display color, the background color, the display color palette, the background color palette, the shape, the paint-over pattern, and the overlapping attribute. The band palette producing unit 14 which receives the end signal writes the bit map palette value produced by the bit map palette producing unit 3, into the band palette dictionary 16 using the final palette value as the address, and stores the final palette value indicative of the dictionary size and the content of the band palette dictionary 16 into the vector portion data storage unit 5 shown in FIG. 35 from the address "0" to the address indicative of the final palette value. Then, the band palette producing unit 14 accomplishes the palette producing operation. The bit map palette producing unit 3 shown in FIG. 35 produces the value which is obtained by incrementing by "1" the final palette value outputted from the band palette producing unit 14, as the bit map palette value which constitutes the input to the palette producing unit 14.

Next, when the production of the band palette dictionary 16 is ended, the vector portion data producing unit 4 shown in FIG. 35 receives from the band dividing means 13 the palette-added vector data written back by the band palette producing unit 14 and the bit map data as the vector data input and the bit map data input, respectively. Then, the vector portion data producing unit 4 produces the vector portion data based on the palette values. As indicated in FIG. 17, the production of the vector portion data is performed by the vector portion data producing unit 4 using the display color palette, the background color palette, the shape, the paint-over pattern and the overlapping attribute of the palette-added vector data received from the band dividing unit 13 shown in FIG. 17, and the bit map palette value obtained from the bit map palette producing unit 3 instead of the origin, the width, the height, the overlapping attribute and the pixel value of the bit map data input shown in FIG. 5. The vector portion data producing unit 4 inputs the palette-added vector data, the bit map data and the bit map palette value. The palette-added vector data and the bit map data are processed in the input order. When the palette-added vector data is inputted, the overlapping process operation $4_1$ is carried out using the overlapping attribute for the following three data. That is, the value (S) at the pixel position obtained by binary-expanding the shape, the display color palette (F) and the background color palette (B); the vector portion data read-out value obtained by reading to the storage pixel register (VD) $4_2$ the data which is stored at the pixel position in the vector portion data storage unit 5 shown in FIG. 35; and the paint-over pattern data (PV). The overlapping-processed data is written into the processed data register (VW) $4_3$, and the value of the processed data register (VW) $4_3$ is written at the pixel data position in the vector portion data storage unit 5. The overlapping process operation $4_1$ is performed based on the value of the overlapping attribute as shown in FIG. 9. When the bit map data is inputted, with respect to the pixel in the area defined by the origin, the height and the width, the overlapping process operations $4_1$ is carried out using the overlapping attribute for the following three data. That is, the bit map palette value (BP) produced by the bit map palette producing unit 3; the vector portion data read-out value obtained by reading to the storage pixel register (VD) $4_2$ at the pixel position in the data which is stored in the vector portion data storage unit 5 shown in FIG. 35; and the paint-over pattern data (PB) of the bit map data. This overlapping-processed data is written into the processed data register (VW) $4_3$, and the value of the processed data register (VW) $4_3$ is written at the pixel data position in the vector portion data storage unit 5. The overlapping process operation $4_1$ is performed based on the value of the overlapping attribute as shown in FIG. 10.

The vector portion data storage unit 5 shown in FIG. 35 comprises a memory for storing the vector portion data, and initializes all memory values stored in the memory before the vector data and the bit map data are inputted. Next, in accordance with the process by the palette producing unit 14, the final palette value and the content of the band palette dictionary 16 are written into the memory. Furthermore, in accordance with the process by the vector portion data producing unit 4, the pixel position data is read out as the vector portion data read-out value shown in FIG. 7, and also the data is written at the pixel position as the vector portion data write value.

As indicated in FIG. 8, the bit map portion data producing unit 33 shown in FIG. 35 inputs the bit map data, and then produces the bit map portion data based on the pixel value, the value of the paint-over pattern, the overlapping attribute of the bit map data, and the pixel value stored in the bit map portion data producing buffer. It should be noted that the pixel value of the bit map data and the pixel value stored in the bit map portion data producing buffer have the values of colors (C, M, Y, K). The bit map portion data producing buffer is a memory having the content of (the pixel number within the band×the bit number (32 bits) of C/M/Y/K). Also, upon receipt of the start signal, the bit map portion data producing unit 33 sets "0" to all of the data stored in the bit map portion data producing buffer. With respect to all of the pixel positions defined by the origin, the height and the width of the bit map data, the overlapping process operation $6_1$ is carried out using the overlapping attribute for the following two data. That is, the pixel value (BI) and the paint-over pattern data (PB) of the bit map data; and the bit map portion data read-out value obtained by reading to the storage pixel register (BD) $6_2$ the data stored at the pixel position in the bit map portion data producing buffer shown in FIG. 35. Then, this overlapping-processed data is written into the processed-data register (BW) $6_3$, and also the value of the processed-data register $6_3$ is written at the pixel data position within the band in the bit map portion data producing buffer. The overlapping process operation $6_1$ is carried out based on the value of the overlapping attribute as shown in FIG. 11. Upon receipt of the end signal, the bit map portion data produced in this manner sends the content of the bit map portion data producing buffer to the bit map portion coding unit 32 shown in FIG. 35 by the bit map portion data producing unit 33.

An image characteristic setting unit 37 shown in FIG. 35 comprises an image characteristic register set by a user. The user may set either a character priority or a gradation priority. Also, the image characteristic setting unit 37 comprises image characteristic instruction data as an output signal. When the characteristic priority is set by the user, the image characteristic setting unit 37 outputs "1" as the image characteristic instruction data, whereas when the gradation priority is set by the user, it outputs "0" as the image characteristic instruction data.

Figure 36:
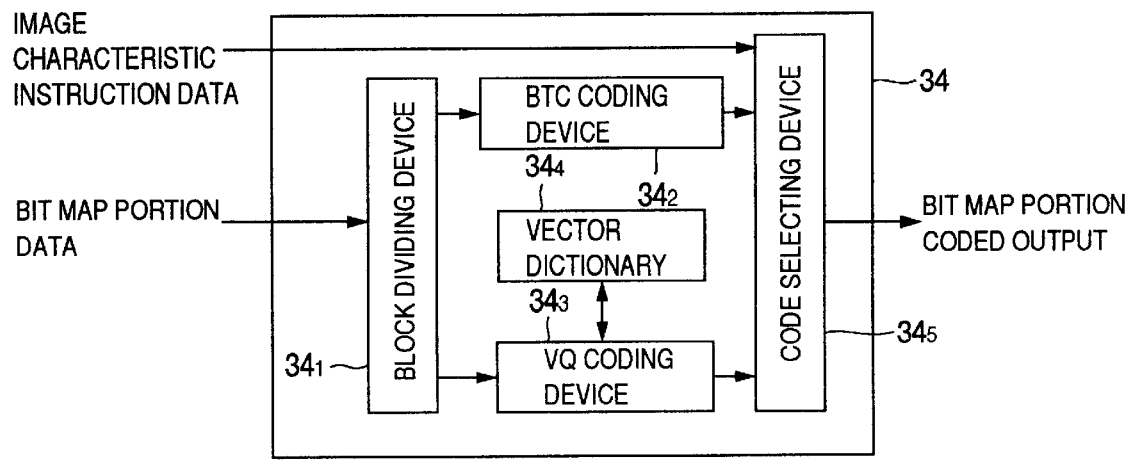
FIG. 36 is a block diagram of a bit map portion coding unit in the fourth embodiment.
Figure 37:
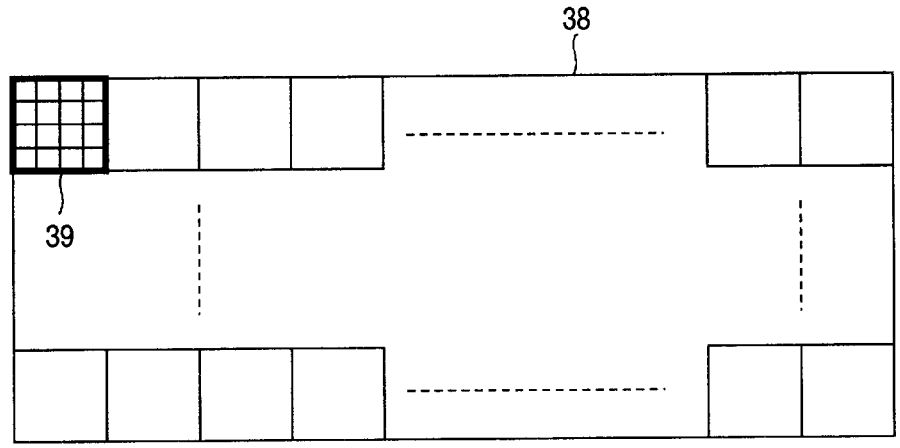
FIG. 37 is a diagram representing a process example of a block dividing device in the fourth embodiment.

Upon receipt of the bit map portion data produced by the bit map portion data producing unit 33 and the image characteristic instruction data set by the image characteristic setting unit 37, the bit map portion coding unit 34 shown in FIG. 35 codes the bit map portion data. FIG. 36 is a block diagram of the bit map portion coding unit 34. In FIG. 36, a block dividing device 341 subdivides the bit map portion data derived from the bit map portion data producing unit 33 into a plurality of blocks constructed of 4×4 pixels as shown in FIG. 37. In this FIG. 37, reference numeral 38 denotes bit map portion data producing buffer data, and reference numeral 39 denotes the block data of 4×4 pixels which is block-divided. Upon receipt of the output of the block dividing device $34_1$, the data coding operation is carried out by a BTC coding device $34_2$ and a VQ coding device $34_3$ for performing a vector quantization shown in FIG. 36. The BTC coding device $34_2$ selects a representative plane on each of C/M/Y/K planes of the block data subdivided by the block dividing device $34_1$. Then, the BTC coding device $34_2$ executes a binary operation in such a manner that when the pixel value of the representative plane is larger than a threshold value, "1" is applied, whereas when the pixel value of the representative plane is smaller than the threshold value, "0" is applied. Here, the threshold value is determined by the average value of the representative planes. Furthermore, as the coded output of the BTC coding device $34_2$, the BTC coding-device $34_2$ outputs the binary data of the representative plane, a typical value for a high density side of each of the C/M/Y/K planes, and a typical value for a low density side of each of the C/M/Y/K planes. That is, the BTC coding device $34_2$ calculates the average value of the pixels at the portions corresponding to the binary data of "1" which is obtained on the representative planes with respect to each of the C/M/Y/K planes, and then uses the average value as the high-density-sided typical value. Also, the BTC coding device $34_2$ calculates the average value of the pixels at the portions corresponding to the binary data of "0" which is obtained on the representative planes with respect to each of the C/M/Y/K planes, and then uses the average value as the low-density-sided typical value. The vector dictionary $34_4$ has the typical brightness (intensity) data which is prepared in advance in the a dictionary memory having the 16-byte data width and the addresses "0" to "1,024". The VQ coding device $34_3$ firstly performs a color space converting operation from the CMYK color space to the YUV color space with respect to the block data obtained from the block dividing device $34_1$, so that the brightness data (Y) is obtained. Next, the VQ coding device $34_3$ compares 16 pieces of the brightness data with the data stored in the vector dictionary $34_4$ to select an address having the most resembled dictionary data as a code of the brightness. Then, the VQ coding device $34_3$ outputs the obtained code of the brightness and the respective average value of the U/V as the coded output of the VQ coding device $34_3$. With respect to the coded data which has been obtained by the BTC coding device $34_2$ and the VQ coding device $34_3$, a code selecting unit $34_5$ shown in FIG. 36 selects the coded output of the BTC coding device $34_2$ as the bit map portion coded output in case the image characteristic instruction data outputted from the image characteristic setting unit 37 is equal to "1". On the other hand, the code selecting unit $34_5$ selects the coded output of the VQ coding device $34_3$ as the bit map portion coded output in case the image characteristic instruction data is equal to "0".

The bit map portion data storage unit 35 shown in FIG. 35 comprises a memory for storing the bit map portion data, and initializes all memory values stored in the memory before the vector data and the bit map data are inputted. Then, the bit map portion data storage means 35 stores the bit map portion coded output of the bit map portion coding unit 34 as the bit map portion data.

As explained above, the vector data and the bit map data are once stored into the vector portion data storage unit and the bit map portion data storage unit 35, respectively. Upon receipt of the image output request, the data overlapping operation is performed for the following two data by the vector portion data overlapping unit 15 shown in FIG. 35. That is, the data obtained by bit-map-expanding the coded data stored in the bit map portion data stored unit 35, by the bit map portion expanding means 36; and the vector portion data stored in the vector portion data storage unit 5. The overlapped data is outputted as the band image data.

Figure 38:
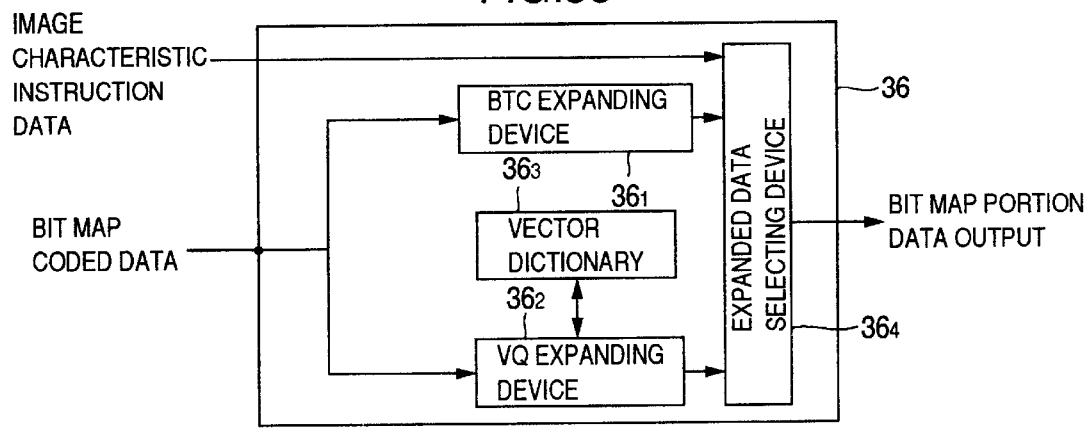
FIG. 38 is a block diagram of a bit map portion extending unit in the fourth embodiment.
Figure 39:
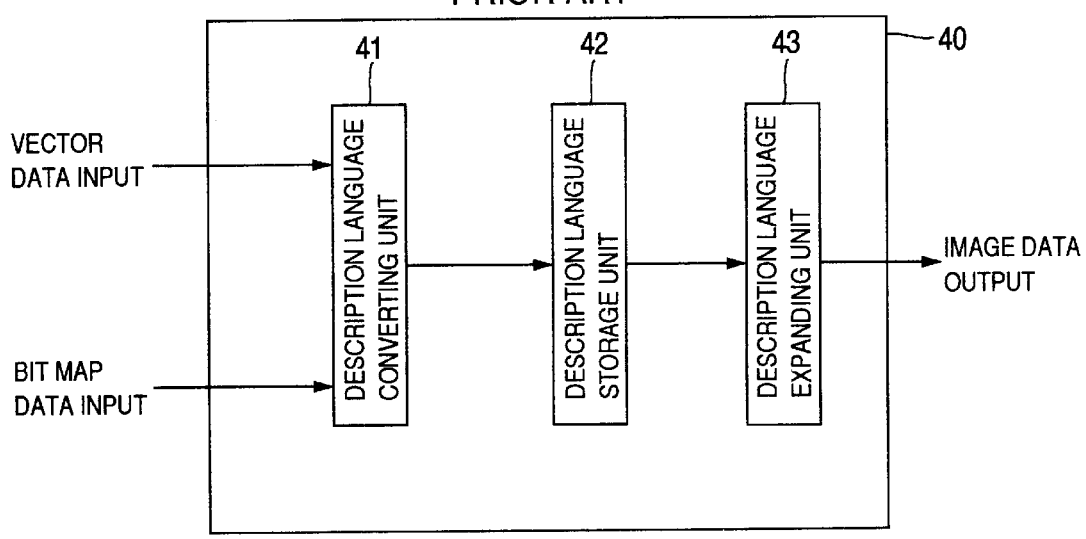
FIG. 39 is a block diagram of a conventional image processing apparatus by the description language.
Figure 40:
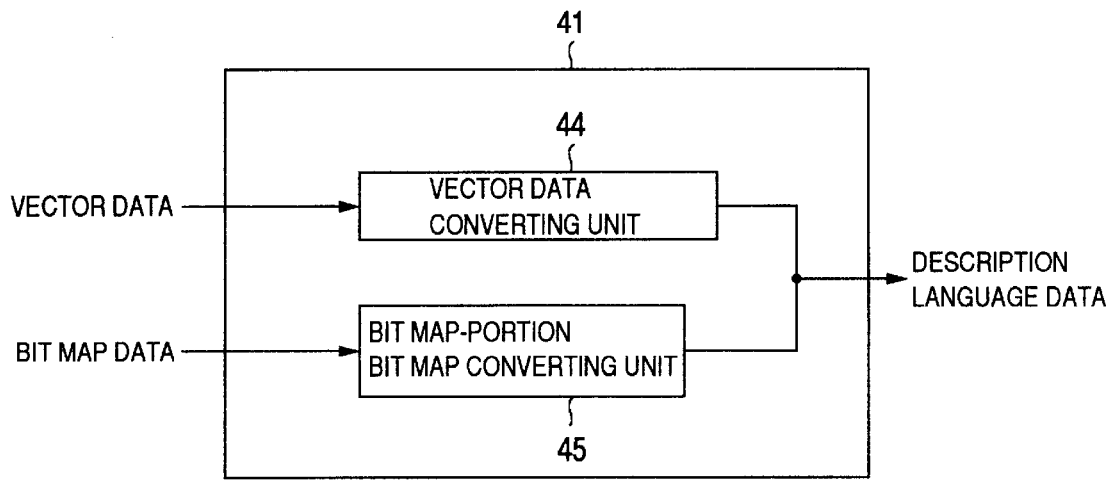
FIG. 40 is a block diagram of a description language converting unit in the conventional image processing apparatus by the description language.
Figure 41:
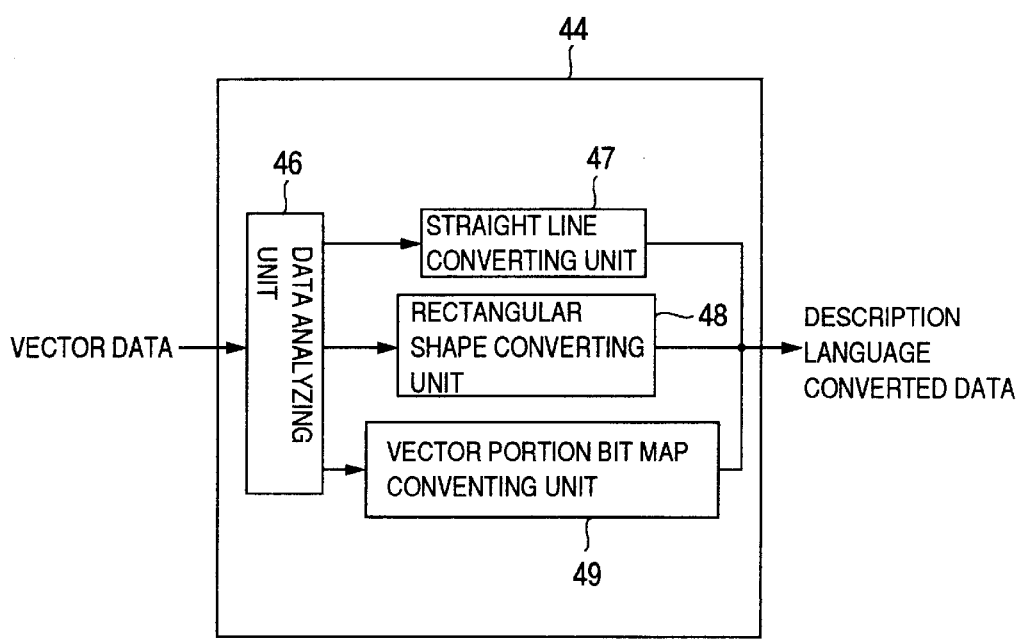
FIG. 41 is a block diagram of a vector data converting unit in the conventional image processing apparatus by the description language.

FIG. 38 shows a block diagram of a bit map portion expanding unit 36. The bit map coded data outputted from the bit map portion data storage unit 35 is expanded by a BTC expanding device $36_1$ and a VQ expanding device $36_2$. In the BTC expanding device $36_1$, the binary data of the representative plane is first obtained from the bit map coded data, and the high-density-sided data of the respective C/M/Y/K planes are expanded at the positions where the binary data is equal to "1", whereas the lowdensity-sided data of the respective C/M/Y/K planes are expanded at the position where the binary data is equal to "0". Thereafter, the data expanding operation is completed. The VQ expanding device $36_2$ first obtains the address of a vector dictionary $36_3$ from the bit map portion coded data, derives 16 pixels of the brightness data (Y) from the vector dictionary $36_3$, and performs the color space converting operation from the YUV color space to the CMYK color space using the brightness data and the average value of U/V. Thus, the data expanding operation is completed. As to the data expanded in this manner, when the image characteristic instruction data of the image characteristic setting unit 37 is equal to "1", the expanded data selecting device $36_4$ selects the expanded data derived from the BTC expanding device $36_1$ as the bit map portion data. On the other hand, when the image characteristic instruction data of the image characteristic setting unit 37 is equal to "0", the expanded data selecting device $36_4$ selects the expanded data derived from the VQ expanding device $36_2$ as the bit map portion data.

As indicated in FIG. 18, the vector portion data overlapping unit 15 inputs the bit map portion data (C, M, Y, K) outputted from the pixel position of the band image data output in the bit map portion expanding unit 36; the vector portion data (the palette value) stored at the pixel position in the vector portion data storage unit 5; and the bit map palette value at the band position (the final address of the band palette dictionary). In the band palette dictionary $15_2$, data obtained by reading out the band palette dictionary data of the band to be outputted which is stored in the vector portion data storage unit 5 is stored. A bit map palette judgment $15_1$ shown in FIG. 18 judges as to whether or not the palette value indicated by the vector portion data is identical to the bit map palette value of the band, and then outputs the judgment result and the vector portion data. In an output overlapping process $15_3$, in case the bit map palette judgment $15_1$ judges that the palette value of the pixel of the vector portion data is identical to the bit map palette value, the bit map portion data is outputted as the value of the pixel.

On the other hand, in case the bit map palette judgment $15_1$ judges that the palette value of the pixel of the vector portion data is not identical to the bit map palette value of the band, the content of the data read out from the band palette dictionary $15_2$ using the palette value as the address is outputted as the value of the pixel. By performing the process of the band image data from the band "0" to the band "n", the image processing apparatus 32 shown in FIG. 32 can obtain the image output data.

As described above, in accordance with the fourth embodiment, the input image data is represented by the palette value of the vector data and the bit map palette value every band, and also the band palette dictionary is produced every band. As a consequence, the size of the palette dictionary can be made small, and therefore, the storage capacity of the vector data represented by the palette which is produced from the palette dictionary can be reduced. Also, the bit map unit has the coding selecting unit for setting the coding operation by the user, the coding operation is carried out in accordance with the image characteristic, so that the storage capacity of the bit map portion data can be reduced and the image output from the storage memory can be performed by only one overlapping operation.

What is claimed is:

1. An image processing apparatus comprising:

palette producing means for producing from vector data a palette dictionary made of a palette value which is indicative of a combination of primary colors, with respect to an image data input constituted by the vector data and bit map data both of which have a plurality of overlapping attributes;

bit map palette producing means for registering one palette value specific to the bit map data in the palette dictionary as a bit map palette value, in the palette producing means;

vector portion data producing means for performing an image drawing operation for the vector data using the palette value stored in the palette dictionary produced by the palette producing means, and for the bit map data using the bit map palette value stored in the palette dictionary produced by the bit map palette producing means, when the image drawing operation is performed using the overlapping attributes of the vector data and bit map data, and producing vector portion data by overlapping two image drawings in accordance with the overlapping attributes;

vector portion data storage means for storing the vector portion data produced by the vector portion data producing means, and the palette dictionaries produced by the palette producing means and the bit map palette producing means;

bit map portion data producing means for producing bit map portion data by performing an image drawing operation for only the bit map data input using the overlapping attribute;

bit map portion data storage means for storing the bit map portion data produced by the bit map portion data producing means; and vector portion data overlapping means for operating in a following manner in case the bit map portion data stored in the bit map portion data storage means is overlapped with the vector portion data stored in the vector portion data storage means: when the vector portion data has the bit map palette value indicative of a bit map, an overwrite process operation is not performed over the bit map portion data, whereas when the vector portion data has a value except for the bit map palette value indicative of the bit map, the palette value of the vector portion data is bit-mapped using the palette dictionary over the bit map portion data to perform the overwrite process operation.

2. An image processing apparatus comprising:

band dividing means for allocating input image data to areas divided into bands constructed of a plurality of rasters, with respect to an image data input constituted by vector data and bit map data both of which have a plurality of overlapping attributes;

palette producing means for producing a band palette dictionary made of a palette value indicative of a combination of primary colors, based on the input vector data band-divided by the band dividing means;

bit map palette producing means for registering one palette value specific to the bit map data divided by the band dividing means, as a bit map palette value into the band palette dictionary in the palette producing means;

vector portion data producing means for performing an image drawing operation for the vector data using the palette value stored in the band palette dictionary produced by the palette producing means, and for the bit map data using the bit map palette value stored in the band palette dictionary produced by the bit map palette producing means, when the image drawing operation is performed using the overlapping attributes of the vector data and the bit map data both of which are divided into bands by the band dividing means, and producing vector portion data by overlapping two image drawings in accordance with the overlapping attributes;

vector portion data storage means for storing the vector portion data produced by the vector portion data producing means, and the band palette dictionaries produced by the palette producing means and the bit map palette producing means;

bit map portion data producing means for producing bit map portion data by performing an image drawing operation for only the bit map data input divided into bands by the band dividing means, using the overlapping attribute;

bit map portion data storage means for storing the bit map portion data produced by the bit map portion data producing means; and vector portion data overlapping means for operating in a following manner in case the bit map portion data stored in the bit map portion data storage means is overlapped with the vector portion data stored in the vector portion data storage means every band divided by the band dividing means: when the vector portion data has the bit map palette value indicative of a bit map, an overwrite process operation is not performed over the bit map portion data, whereas when the vector portion data has a value except for the bit map palette value indicative of the bit map, the palette value of the vector portion data is bit-mapped using the band palette dictionary over the bit map portion data to perform the overwrite process operation.

3. An image processing apparatus comprising:

band dividing means for allocating input image data to areas divided into bands constructed of a plurality of rasters, with respect to an image data input constituted by vector data and bit map data both of which have a plurality of overlapping attributes;

palette producing means for producing a band palette dictionary made of a palette value indicative of a combination of primary colors, based on the input vector data band-divided by the band dividing means;

bit map palette producing means for registering one palette value specific to the bit map data divided by the band dividing means, as a bit map palette value into the band palette dictionary in the palette producing means;

vector portion data producing means for performing an image drawing operation for the vector data using the palette value stored in the band palette dictionary produced by the palette producing means, and for the bit map data using the bit map palette value stored in the band palette dictionary produced by the bit map palette producing means, when the image drawing operation is performed using the overlapping attributes of the vector data and the bit map data both of which are divided into bands by the band dividing means, and producing vector portion data by overlapping two image drawings in accordance with the overlapping attributes;

block dividing means for dividing the vector portion data produced by the vector portion data producing means, into blocks constructed of a plurality of pixels;

vector portion block code allocating means for producing vector portion block code data by allocating codes to the vector portion data divided into blocks by the block dividing means, in response to the number of sorts of palette values within the blocks, and producing a block palette dictionary indicative of a combination between the palette value and a code value;

vector portion data storage means for storing the vector portion block code data and the block palette dictionary both of which are produced by the vector portion block code allocating means, and the band palette dictionaries produced by the palette producing means and the bit map palette producing means;

bit map portion data producing means for producing bit map portion data by performing an image drawing operation for only the bit map data input divided into bands by the band dividing means, using the overlapping attribute;

bit map portion data storage means for storing the bit map portion data produced by the bit map portion data producing means; and vector portion data overlapping means for operating in a following manner in case the bit map portion data stored in the bit map portion data storage means is overlapped with the vector portion data stored in the vector portion data storage means every band divided by the band dividing means: the vector portion data is expanded into a palette value using the vector portion block code data and the block palette dictionary, and when the vector portion data has the bit map palette value indicative of a bit map, an overwrite process operation is not performed over the bit map portion data, whereas when the vector portion data has a value except for the bit map palette value indicative of the bit map, the palette value of the vector portion data is bit-mapped using the band palette dictionary over the bit map portion data to perform the overwrite process operation.

4. An image processing apparatus comprising:

band dividing means for allocating input image data to areas divided into bands constructed of a plurality of rasters, with respect to an image data input constituted by vector data and bit map data both of which have a plurality of overlapping attributes;

palette producing means for producing a band palette dictionary made of a palette value indicative of a combination of primary colors, based on the input vector data band-divided by the band dividing means;

bit map palette producing means for registering one palette value specific to the bit map data divided by the band dividing means, as a bit map palette value into the band palette dictionary in the palette producing means;

vector portion data producing means for performing an image drawing operation for the vector data using the palette value stored in the band palette dictionary produced by the palette producing means, and for the bit map data using the bit map palette value stored in the band palette dictionary produced by the bit map palette producing means, when the image drawing operation is performed using the overlapping attributes of the vector data and the bit map data both of which are divided into bands by the band dividing means, and producing vector portion data by overlapping two image drawings in accordance with the overlapping attributes;

block dividing means for dividing the vector portion data produced by the vector portion data producing means, into blocks constructed of a plurality of pixels;

palette sort calculating means for calculating as a palette number, a sort of a palette value of the vector portion data divided into blocks by the block dividing means;

vector portion block code allocating means for producing the vector portion data divided into the blocks by the block dividing means using only the palette value as data when the palette number calculated by the palette sort calculating means is equal to "1", whereas for performing a production of vector portion block code data for which a code is allocated in response to the number of sorts of the palette values when the palette number calculated by the palette sort calculating means is equal to any number other than "1", and for producing a block palette dictionary indicative of a combination between a palette value and a code value;

vector portion data storage means for storing the vector portion block code data and the block palette dictionary both of which are produced by the vector portion block code allocating means, and the band palette dictionaries produced by the palette producing means and the bit map palette producing means;

bit map portion data producing means for producing bit map portion data by performing an image drawing operation for only the bit map data input divided into bands by the band dividing means, using the overlapping attribute;

bit map portion data storage means for storing the bit map portion data produced by the bit map portion data producing means; and vector portion data overlapping means for operating in a following manner in case the bit map portion data stored in the bit map portion data storage means is overlapped with the vector portion data stored in the vector portion data storage means every band divided by the band dividing means: the vector portion data is expanded into a palette value using the vector portion block code data and the block palette dictionary, and when the vector portion data has the bit map palette value indicative of a bit map, an overwrite process operation is not performed over the bit map portion data, whereas when the vector portion data has a value except for the bit map palette value indicative of the bit map, the palette value of the vector portion data is bit-mapped using the band palette dictionary over the bit map portion data to perform the overwrite process operation.

5. An image processing apparatus comprising:

band dividing means for allocating input image data to areas divided into bands constructed of a plurality of rasters, with respect to an image data input constituted by vector data and bit map data both of which have a plurality of overlapping attributes;

palette producing means for producing a band palette dictionary made of a palette value indicative of a combination of primary colors, based on the input vector data band-divided by the band dividing means;

bit map palette producing means for registering one palette value specific to the bit map data divided by the band dividing means, as a bit map palette value into the band palette dictionary in the palette producing means;

vector portion data producing means for performing an image drawing operation for the vector data using the palette value stored in the band palette dictionary produced by the palette producing means, and for the bit map data using the bit map palette value stored in the band palette dictionary produced by the bit map palette producing means, when the image drawing operation is performed using the overlapping attributes of the vector data and the bit map data both of which are divided into bands by the band dividing means, and producing vector portion data by overlapping two image drawings in accordance with the overlapping attributes;

block dividing means for dividing the vector portion data produced by the vector portion data producing means, into blocks constructed of a plurality of pixels;

palette sort calculating means for calculating as a palette number, a sort of a palette value of the vector portion data divided into blocks by the block dividing means;

palette number limiting means for setting a palette number limit value corresponding to the number of the sorts of the palette values within the blocks of the vector portion data divided into the blocks by the block dividing means;

vector portion block code allocating means for performing a production of vector portion block code data for which a code is allocated in response to the number of sorts of the palette values and a production of a block palette dictionary indicative of a combination between a palette value and a code value when the palette number calculated by the palette sort calculating means is smaller than the palette number limiting value of the palette number limiting means, whereas for replacing a palette value whose occurrence frequency degree is low with another palette value whose occurrence frequency degree is high and which is located around the palette value, suppressing the number of the sorts of the palette values to the number smaller than, or equal to the palette number limiting value, and then performing a production of vector portion block code data for which a code is allocated in response to the number of sorts of the palette values and a production of a block palette dictionary indicative of a combination between a palette value and a code value when the palette number calculated by the palette sort calculating means is larger than, or equal to the palette number limiting value;

vector portion data storage means for storing the vector portion block code data and the block palette dictionary both of which are produced by the vector portion block code allocating means, and the band palette dictionaries produced by the palette producing means and the bit map palette producing means;

bit map portion data producing means for producing bit map portion data by performing an image drawing operation for only the bit map data input divided into bands by the band dividing means, using the overlapping attribute;

bit map portion data storage means for storing the bit map portion data produced by the bit map portion data producing means; and vector portion data overlapping means for operating in a following manner in case the bit map portion data stored in the bit map portion data storage means is overlapped with the vector portion data stored in the vector portion data storage means every band divided by the band dividing means: the vector portion data is expanded into a palette value using the vector portion block code data and the block palette dictionary, and when the vector portion data has the bit map palette value indicative of a bit map, an overwrite process operation is not performed over the bit map portion data, whereas when the vector portion data has a value except for the bit map palette value indicative of the bit map, the palette value of the vector portion data is bit-mapped using the band palette dictionary over the bit map portion data to perform the overwrite process operation.

6. An image processing apparatus comprising:

palette producing means for producing a band palette dictionary made of a palette value indicative of a combination of primary colors, based on input vector data, with respect to an image data input constituted by vector data and bit map data both of which have a plurality of overlapping attributes;

bit map palette producing means for registering one palette value specific to the bit map data, as a bit map palette value into the palette dictionary in the palette producing means;

vector portion data producing means for performing an image drawing operation for the vector data using the palette value stored in the palette dictionary produced by the palette producing means, and for the bit map data using the bit map palette value stored in the palette dictionary produced by the bit map palette producing means, when the image drawing operation is performed using the overlapping attributes of the vector data and the bit map data, and producing vector portion data by overlapping two image drawings in accordance with the overlapping attributes;

vector portion data storage means for storing the vector portion data produced by the vector portion data producing means, and the palette dictionaries produced by the palette producing means and the bit map palette producing means;

bit map portion data producing means for producing bit map portion data by performing an image drawing operation for only the bit map data input using the overlapping attribute;

image characteristic setting means for specifying an image output characteristic of the bit map data set by a user, with respect to the bit map portion data produced by the bit map portion data producing means;

bit map portion coding means for performing a coding operation in accordance with the specification of the image characteristic setting means;

bit map portion data storage means for storing code data produced by the bit map portion data coding means;

bit map portion expanding means for expanding the code data of the bit map portion data storage means in accordance with the specification of the image characteristic setting means; and vector portion data overlapping means for operating in a following manner in case the bit map portion data expanded by the bit map portion expanding means is overlapped with the vector portion data stored in the vector portion data storage means: when the vector portion data has the bit map palette value indicative of a bit map, an overwrite process operation is not performed over the bit map portion data, whereas when the vector portion data has a value except for the bit map palette value indicative of the bit map, the palette value of the vector portion data is bit-mapped using the palette dictionary over the bit map portion data to perform the overwrite process operation.

* * * * *